US007359886B2

(12) United States Patent
Sakurai et al.

(10) Patent No.: US 7,359,886 B2
(45) Date of Patent: Apr. 15, 2008

(54) INJECTION-MOLDING COST ESTIMATION SYSTEM

(75) Inventors: Michikazu Sakurai, Saitama (JP); Hikaru Amano, Tokyo (JP); Masayuki Ueda, Kanagawa (JP); Keiichi Kai, Kanagawa (JP); Hirokatsu Hiraoka, Kanagawa (JP); Katsuji Morita, Kanagawa (JP); Fuminari Yashiro, Kanagawa (JP); Masatoshi Watanabe, Tokyo (JP); Noboru Sugawara, Kanagawa (JP); Megumi Yamamoto, Kanagawa (JP); Daiho Sakuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 922 days.

(21) Appl. No.: 10/437,902

(22) Filed: May 15, 2003

(65) Prior Publication Data

US 2003/0229599 A1 Dec. 11, 2003

(30) Foreign Application Priority Data

May 15, 2002 (JP) .............................. 2002-140161

(51) Int. Cl.
 *G06Q 99/10* (2006.01)
(52) U.S. Cl. .............................. 705/400; 705/1; 705/8; 705/9; 705/10; 705/26; 700/96; 700/97; 700/98
(58) Field of Classification Search .................... 705/1, 705/400, 9; 700/96–98
See application file for complete search history.

(56) References Cited

U.S. PATENT DOCUMENTS 4,587,699 A 5/1986 Kadomatsu et al.
4,707,382 A 11/1987 Tajima et al.
4,860,417 A 8/1989 Tajima et al.
5,960,417 A * 9/1999 Pan et al. .................... 705/400
6,701,200 B1 * 3/2004 Lukis et al. .................. 700/98
2001/0023418 A1 * 9/2001 Suzuki et al. ............... 705/400
2001/0051891 A1 * 12/2001 Yamamoto et al. ............ 705/9
2002/0065790 A1 * 5/2002 Oouchi ........................ 705/400

FOREIGN PATENT DOCUMENTS

CN 1150847 A 5/1997

OTHER PUBLICATIONS

Protomold.com.*
Protomold.com Jun. 5, 2000.*
Karapatis et al. "Direct rapid tooling: a review of current research", 1998, Rapid Prototyping Journal, v4n2 pp. 77-89. 14 pgs.*

* cited by examiner

*Primary Examiner*—John W. Hayes
*Assistant Examiner*—Freda A. Nelson
(74) *Attorney, Agent, or Firm*—Oblon, Spivak, McClelland, Maier & Neustadt, P.C.

(57) ABSTRACT

An estimation system for estimating an injection-molding related cost comprises an input unit, storage, a data processing unit, and an output unit. The storage stores a mold estimation function for each of cost items of a mold used to produce a molded product, and a mold estimation reference value table for recording mold estimation reference values in association with prescribed conditions. The data processing unit acquires a fabrication condition of the molded product through the input unit, reads the mold estimation function and one of the mold estimation reference values from the storage corresponding to the fabrication condition, and estimates a cost of the mold based on the mold estimation function and the selected mold estimation reference value. The output unit outputs a mold cost estimation result made by the data processing unit.

18 Claims, 48 Drawing Sheets

FIG.4

MATERIAL INFORMATION

[BEFORE CHANGE]      [AFTER CHANGE]      [BALANCE]      [RATE]

UNIT PRICE OF PART [9.75] ¥ → UNIT PRICE OF PART [0.00] ¥    [0] ¥    [0] %

MATERIAL COST [4.79] ¥ → MATERIAL COST [0.00] ¥    [0] ¥    [0] %

MATERIAL NAME [POM]      PRODUCT NAME [DURACON SW01 N HB]

DIMENSIONS OF PRODUCT

LENGTH [46.500] mm    WIDTH [41.000] mm    DEPTH [35.000] mm — d1

VOLUME OF PRODUCT [7,500,000] mm3 [CALCULATE VOLUME FROM WEIGHT] [INPUT VOLUME] — d6
     d2    d3

WEIGHT OF PRODUCT [10.650] g    WEIGHT OF SPOOL RUNNER [3.20] g    (30.5%)
       d4

PROJECTED AREA OF PRODUCT [1,906.500] mm2 — d7

GRADE OF APPEARANCE [NOT SPECIFIED]

JGMA GRADE [NOT SPECIFIED] ▶ — d8

GEAR TOOTH ● YES ○ NO — d9

| GEAR TYPE | # OF GEAR STEPS | — d10 |
|---|---|---|
| SPUR GEAR | [0] | |
| HELICAL GEAR | [0] | |

[RETURN] [CANCEL] [PROCESS PAGE] [CALCULATE] [HELP]

FIG.5

COMPREHENSIVE PROCESS SETTING

| PROCESS NAME | # OF PROCESS | PROCESS NAME | # OF PROCESS |
|---|---|---|---|
| Molding | 1 | | |
| Gate Cut | 1 | | |
| Gate Cut (Jump Gate) | 0 | | |
| Press Injection | 0 | | |
| Bearing Injector | 0 | | |
| Hit Insert | 0 | | |
| Ultrasonic Insert | 0 | | |
| Heart Caulking | 0 | | |
| Ultrasonic Welding | 0 | | |
| Net Stamp | 0 | | |
| Silk Printing | 0 | | |
| Plastic Packaging | 0 | | |
| Exterior Cleaning | 1 | | |
| Special Process | | | |

OK
CANCEL
HELP

FIG.6

MATERIAL INFORMATION

[BEFORE CHANGE]
UNIT PRICE OF PART [9.75] ¥ → 
MATERIAL COST [4.79] ¥ →

[AFTER CHANGE]
UNIT PRICE OF PART [0.00] ¥    [BALANCE] [0] ¥  [RATE] [0] %
MATERIAL COST [0.00] ¥    [0] ¥    [0] %

[RETURN] [CANCEL] [CALCULATE] [HELP]

| PROCESS NAME | C/T COST CENTER | (DIRECT) | SPECIFIED COST CENTER | SPOT | COST |
|---|---|---|---|---|---|
| ▶ Molding | ▶ Molding 55t (COLD) | ☐ | ▶ Molding 55t (COLD) | 0 | 0.00 |
| ▶ Gate Cut | ▶ Gate Cut (Side Gate) | ☐ | ▶ Gate Cut (Side Gate) | 1 | 0.00 |
| ▶ Exterior Cleaning | ▶ Exterior Cleaning | ☐ | ▶ Exterior Cleaning | 0 | 0.00 |
| ▶ | ▶ | ☐ | ▶ | | |
| ▶ | ▶ | ☐ | ▶ | | |
| ▶ | ▶ | ☐ | ▶ | | |
| ▶ | ▶ | ☐ | ▶ | | |
| ▶ | ▶ | ☐ | ▶ | | |

[DELETE]

FIG.7

| [BEFORE CHANGE] | [AFTER CHANGE] | [BALANCE] | [RATE] |
|---|---|---|---|
| Cost of Mold ¥ | → Cost of Mold ¥ | ¥ 0 | 0 % |

DIMENSIONS OF PRODUCT

| LENGTH | mm | WIDTH | mm | DEPTH | mm |
|---|---|---|---|---|---|
| CLASSIFICATION | LEVER | GRADE OF APPEARANCE | NOT SPECIFIED | GRADE OF DIMENSIONS | OTHER THAN GRADE 0 | TYPE OF RUNNER | HOT RUNNER |
| EQUIPMENT CAPACITY | FORMING, 55t (COLD) | # OF PIECES | | SHOT | | MATERIAL QUALITY | POM | GEOMETRIC TOLERANCE | NOT SPECIFIED |
| # OF PLATES | PER MOLD | PRODUCT WEIGHT | g | VOLUME | mm3 | SPECIAL MATERIAL | NOT USED |

REQUIREMENT OF SUPPORT/TECHNIQUE ⊙YES ○NO    # OF HOT RUNNER GATE SPOTS 1 ▼ PER MOLD

<SLIDE CORE DATA> — g1

| No. | WIDTH | HEIGHT | DEPTH | SPOT |
|---|---|---|---|---|
| 1 | 50 | 25 | 38 | 0 ▼ |
| 2 | ... | ... | ... | 0 ▼ |
| 3 | ... | ... | ... | 0 ▼ |
| 4 | ... | ... | ... | 0 ▼ |
| 5 | ... | ... | ... | 0 ▼ |
| 6 | ... | ... | ... | 0 ▼ |
| 7 | ... | ... | ... | 0 ▼ |
| 8 | ... | ... | ... | 0 ▼ |
| 9 | ... | ... | ... | 0 ▼ |
| 10 | ... | ... | ... | 0 ▼ |
| 11 | ... | ... | ... | 0 ▼ |
| 12 | ... | ... | ... | 0 ▼ |

UNIT[mm]

<LOOSE CORE DATA> — g2

| No. | WIDTH | HEIGHT | SPOT |
|---|---|---|---|
| 1 | 50 | 25 | 0 ▼ |
| 2 | ... | ... | 0 ▼ |
| 3 | ... | ... | 0 ▼ |
| 4 | ... | ... | 0 ▼ |
| 5 | ... | ... | 0 ▼ |
| 6 | ... | ... | 0 ▼ |
| 7 | ... | ... | 0 ▼ |
| 8 | ... | ... | 0 ▼ |
| 9 | ... | ... | 0 ▼ |

UNIT[mm]

<TEXTURING DATA> — g3

TEXTURE ⊙YES ○NO

| No. | SPOT | LENGTH | WIDTH |
|---|---|---|---|
| 1 | ▼ | 0.0 | 0.0 | D |
| 2 | ▼ | 0.0 | 0.0 | D |
| 3 | ▼ | 0.0 | 0.0 | D |
| 4 | ▼ | 0.0 | 0.0 | D |
| 5 | ▼ | 0.0 | 0.0 | D |

UNIT[MM]

<ENGRAVING DATA> — g4

OF NEGATIVE PLATE 0 — g5

| INDICATION CHARACTERS | FORMING SURFACE (PROJECTION) HEIGHT 0.5mm | FORMING SURFACE (INDENT) HEIGHT 0.5mm |
|---|---|---|
| CHARACTERS | 0 | 0 |
| (hand icon) | 0 | 0 |
| (symbol) | 0 | 0 |
| Ⓐ | 0 | 0 |
| (blank) | 0 | 0 |
| | | 0 | g6

[RETURN] [CANCEL] [CALCULATE] [HELP]

FIG.8

| DIMENSIONS OF MOLDING PRODUCT (LENGTH × WIDTH × DEPTH) | DIMENSIONS OF MOLD BASE (LENGTH × WIDTH × THICKNESS) | MOLD MATERIAL PRICE (YEN) | | | | | | |
|---|---|---|---|---|---|---|---|---|
| | | TWO-PLATE TYPE | | | THREE-PLATE TYPE | | | |
| | | PRICE OF PURCHASED STANDARDIZED ARTICLE ① | BASE PRICE ② | TOTAL (①+②) | PRICE OF PURCHASED STANDARDIZED ARTICLE ③ | | BASE PRICE ④ | TOTAL (③+④) |
| 112 × 30 × 15 | 180 × 150 × (35+35) | ⋮ | ⋮ | ⋮ | ⋮ | | ⋮ | ⋮ |
| 176 × 110 × 30 | 250 × 180 × (50+60) | ⋮ | ⋮ | ⋮ | ⋮ | | ⋮ | ⋮ |
| 215 × 150 × 18 | 300 × 250 × (40+40) | ⋮ | ⋮ | ⋮ | ⋮ | | ⋮ | ⋮ |
| 215 × 150 × 35 | 300 × 250 × (60+60) | ⋮ | ⋮ | ⋮ | ⋮ | | ⋮ | ⋮ |
| 215 × 150 × 60 | 300 × 250 × (70+80) | ⋮ | ⋮ | ⋮ | ⋮ | | ⋮ | ⋮ |
| ⋮ | ⋮ | ⋮ | ⋮ | ⋮ | ⋮ | | ⋮ | ⋮ |
| ⋮ | ⋮ | ⋮ | ⋮ | ⋮ | ⋮ | | ⋮ | ⋮ |
| ⋮ | ⋮ | ⋮ | ⋮ | ⋮ | ⋮ | | ⋮ | ⋮ |

FIG.9

| DIMENSIONS OF PRODUCT | DIMENSIONS OF MOLDING PRODUCE | | |
|---|---|---|---|
| | LENGTH | WIDTH | DEPTH |
| 112 × 90 × 15 | 112.0 | 90.0 | 15.0 |
| 176 × 110 × 30 | 176.0 | 110.0 | 30.0 |
| 215 × 150 × 18 | 215.0 | 150.0 | 18.0 |
| 215 × 150 × 35 | 215.0 | 150.0 | 35.0 |
| 215 × 150 × 60 | 215.0 | 150.0 | 60.0 |
| ··· × ··· × ··· | ··· | ··· | ··· |
| ··· × ··· × ··· | ··· | ··· | ··· |
| ··· × ··· × ··· | ··· | ··· | ··· |
| ··· × ··· × ··· | ··· | ··· | ··· |

FIG.10

| SLIDE CORE SIZE (WIDTH × HEIGHT × DEPTH) | SLIDE CORE MATERIAL SIZE (WIDTH × HEIGHT × DEPTH) | UNIT PRICE OF STEEL MATERIAL | UNIT PRICE OF PURCHASED | TOTAL |
|---|---|---|---|---|
| 50 × 25 × 38 | 26 × 25 × 38 | ... | ... | ... |
| 50 × 50 × 75 | 56 × 50 × 75 | ... | ... | ... |
| 100 × 50 × 75 | 106 × 50 × 75 | ... | ... | ... |
| 100 × 100 × 150 | 108 × 100 × 150 | ... | ... | ... |
| 200 × 100 × 150 | 208 × 100 × 150 | ... | ... | ... |
| ... | ... | ... | ... | ... |
| ... | ... | ... | ... | ... |

FIG.11

| LOOSE CORE SIZE | | LOOSE CORE MATERIAL SIZE | | UNIT PRICE OF STEEL MATERIAL | UNIT PRICE OF PURCHASED | TOTAL |
|---|---|---|---|---|---|---|
| WIDTH | DEPTH | WIDTH × THICKNESS | HEIGHT | | | |
| 10 | 30 | 10 × 60 | 200 | ... | ... | ... |
|  |  |  | 400 | ... | ... | ... |
|  |  |  | 600 | ... | ... | ... |
|  |  |  | 810 | ... | ... | ... |
| 30 | 40 | 30 × 80 | 200 | ... | ... | ... |
|  |  |  | 400 | ... | ... | ... |
|  |  |  | 600 | ... | ... | ... |
|  |  |  | 810 | ... | ... | ... |
| 50 | 50 | 50 × 100 | 200 | ... | ... | ... |
|  |  |  | 400 | ... | ... | ... |
|  |  |  | 600 | ... | ... | ... |
|  |  |  | 810 | ... | ... | ... |
| 75 | 50 | 75 × 100 | 200 | ... | ... | ... |
|  |  |  | 400 | ... | ... | ... |
|  |  |  | 600 | ... | ... | ... |
|  |  |  | 810 | ... | ... | ... |
| ... | ... | ... | ... | ... | ... | ... |
|  |  |  | ... | ... | ... | ... |
|  |  |  | ... | ... | ... | ... |
|  |  |  | ... | ... | ... | ... |
| ... | ... | ... | ... | ... | ... | ... |
|  |  |  | ... | ... | ... | ... |
|  |  |  | ... | ... | ... | ... |
|  |  |  | ... | ... | ... | ... |

FIG.12

| MOLDED PRODUCT SIZE(mm) | | | LOOSE CORE HEIGHT | LOOSE CORE MATERIAL HEIGHT |
|---|---|---|---|---|
| LENGTH | WIDTH | HEIGHT | (mm) | (mm) |
| 112 | 90 | 15 | 106 | ... |
| 176 | 110 | 30 | 141 | ... |
| 215 | 150 | 18 | 125 | ... |
| | | 35 | 150 | ... |
| | | 60 | 230 | ... |
| 250 | 180 | 23 | 140 | ... |
| | | 45 | 200 | ... |
| 345 | 220 | 33 | 160 | ... |
| | | 65 | ... | ... |
| 385 | 260 | 45 | ... | ... |
| | | 90 | ... | ... |
| 464 | 290 | 60 | ... | ... |
| | | 90 | ... | ... |
| | | 120 | ... | ... |
| ... | ... | ... | ... | ... |
| | | ... | ... | ... |
| ... | ... | ... | ... | ... |
| | | ... | ... | ... |
| | | ... | ... | ... |
| ... | ... | ... | ... | ... |
| | | ... | ... | ... |
| ... | ... | ... | ... | ... |
| | | ... | ... | ... |

FIG.13

| QUALITY OF MATERIAL | WITHOUT GLASS | | | | | | CONTAINING GLASS | | |
|---|---|---|---|---|---|---|---|---|---|
| | GENERAL-PURPOSE MATERIAL (ABS, PS, PE) | | | ENGINEERING PLASTIC MATERIAL (PC, POM, PA, PPE, OTHERS) | | | GLASS-CONTAINING MATERIAL | | |
| PART NAME \ TOTAL # OF SHOTS | INSERT | SLIDE | LOOSE CORE | INSERT | SLIDE | LOOSE CORE | INSERT | SLIDE | LOOSE CORE |
| 5 | PRE-HARDENED STEEL | | | | | | | | |
| 10 | PRE-HARDENED STEEL | PRE-HARDENED STEEL & NITRIDING | PRE-HARDENED STEEL & NITRIDING | | | | PRE-HARDENED STEEL & NITRIDING | | |
| 15 | PRE-HARDENED STEEL | PRE-HARDENED STEEL & NITRIDING | PRE-HARDENED STEEL & NITRIDING | PRE-HARDENED STEEL | | | PRE-HARDENED STEEL & NITRIDING | | |
| 20 | PRE-HARDENED STEEL | PRE-HARDENED STEEL & NITRIDING | PRE-HARDENED STEEL & NITRIDING | PRE-HARDENED STEEL | PRE-HARDENED STEEL & NITRIDING | PRE-HARDENED STEEL & NITRIDING | PRE-HARDENED STEEL & NITRIDING | | |
| 25 | PRE-HARDENED STEEL | PRE-HARDENED STEEL & NITRIDING | PRE-HARDENED STEEL & NITRIDING | PRE-HARDENED STEEL & NITRIDING | PRE-HARDENED STEEL & NITRIDING | PRE-HARDENED STEEL & NITRIDING | HARDENED STEEL & HARDENING | PRE-HARDENED STEEL & NITRIDING | PRE-HARDENED STEEL & NITRIDING |
| 30 | PRE-HARDENED STEEL | | | PRE-HARDENED STEEL & NITRIDING | PRE-HARDENED STEEL & NITRIDING | PRE-HARDENED STEEL & NITRIDING | HARDENED STEEL & HARDENING | PRE-HARDENED STEEL & NITRIDING | PRE-HARDENED STEEL & NITRIDING |
| 35 | PRE-HARDENED STEEL & NITRIDING | | | PRE-HARDENED STEEL & NITRIDING | | | HARDENED STEEL & HARDENING | PRE-HARDENED STEEL & NITRIDING | PRE-HARDENED STEEL & NITRIDING |
| 40 | PRE-HARDENED STEEL & NITRIDING | | | | | | | | |

FIG.14

| SLIDE CORE SIZE (WIDTH × HEIGHT × DEPTH) | SLIDE CORE MATERIAL SIZE (WIDTH × HEIGHT × DEPTH) | UNIT COST OF NITRIDING |
|---|---|---|
| 50 × 25 × 38 | 26 × 25 × 38 | ... |
| 50 × 50 × 75 | 56 × 50 × 75 | ... |
| 100 × 50 × 75 | 106 × 50 × 75 | ... |
| 100 × 100 × 150 | 108 × 100 × 150 | ... |
| 200 × 100 × 150 | 208 × 100 × 150 | ... |
| ... | ... | ... |
| ... | ... | ... |
| ... | ... | ... |

FIG.15

| LOOSE CORE SIZE | | LOOSE CORE MATERIAL SIZE | | UNIT COST OF NITRIDING |
|---|---|---|---|---|
| WIDTH | DEPTH | WIDTH × THICKNESS | HEIGHT | |
| 10 | 30 | 10 × 60 | 200 | ... |
| | | | 400 | ... |
| | | | 600 | ... |
| | | | 810 | ... |
| 30 | 40 | 30 × 80 | 200 | ... |
| | | | 400 | ... |
| | | | 600 | ... |
| | | | 810 | ... |
| 50 | 50 | 50 × 100 | 200 | ... |
| | | | 400 | ... |
| | | | 600 | ... |
| | | | 810 | ... |
| 75 | 50 | 75 × 100 | 200 | ... |
| | | | 400 | ... |
| | | | 600 | ... |
| | | | 810 | ... |
| ... | ... | ... | ... | ... |
| | | | ... | ... |
| | | | ... | ... |
| | | | ... | ... |
| ... | ... | ... | ... | ... |
| | | | ... | ... |
| | | | ... | ... |
| | | | ... | ... |

FIG.16
| INDICATION | UNIT COST OF SYMBOL PER CHARACTER (YEN) | |
| --- | --- | --- |
| | MOLDED PROJECTION (HEIGHT OF SYMBOL=0.5mm) | MOLDED INDENT (HEIGHT OF SYMBOL=0.5mm) |
| CHARACTERS | ... | ... |
| 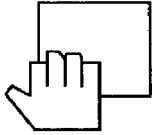 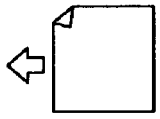 | ... | ... |
| 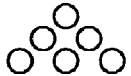 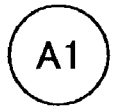 | ... | ... |
| 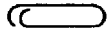 | ... | |

FIG.17

| No. | MOLDED PRODUCT SIZE | | | MC | | RB | | MILLING MACHINE | | PLANE GRINDING | | HAND TAP | | TOTAL TIME |
|---|---|---|---|---|---|---|---|---|---|---|---|---|---|---|
| | LENGTH | WIDTH | HEIGHT | CHANGE-OVER | PROCE-SSING | CHANGE-OVER | PROCE-SSING | CHANGE-OVER | PROCE-SSING | CHANGE-OVER | PROCE-SSING | CHANGE-OVER | PROCE-SSING | |
| 1 | 112 | 90 | 15 | ... | ... | ... | ... | ... | ... | ... | ... | ... | ... | ... |
| 2 | 176 | 110 | 30 | ... | ... | ... | ... | ... | ... | ... | ... | ... | ... | ... |
| 3 | 215 | 150 | 18 | ... | ... | ... | ... | ... | ... | ... | ... | ... | ... | ... |
| 4 | 215 | 150 | 35 | ... | ... | ... | ... | ... | ... | ... | ... | ... | ... | ... |
| 5 | 215 | 150 | 60 | ... | ... | ... | ... | ... | ... | ... | ... | ... | ... | ... |
| 6 | 250 | 180 | 23 | ... | ... | ... | ... | ... | ... | ... | ... | ... | ... | ... |
| 7 | 250 | 180 | 45 | ... | ... | ... | ... | ... | ... | ... | ... | ... | ... | ... |
| 8 | 345 | 220 | 33 | ... | ... | ... | ... | ... | ... | ... | ... | ... | ... | ... |
| 9 | 345 | 220 | 65 | ... | ... | ... | ... | ... | ... | ... | ... | ... | ... | ... |
| 10 | 385 | 260 | 45 | ... | ... | ... | ... | ... | ... | ... | ... | ... | ... | ... |
| ... | ... | ... | ... | ... | ... | ... | ... | ... | ... | ... | ... | ... | ... | ... |

TYPE OF MOLD: TWO-PLATE TYPE | TYPE OF MOLD: THREE-PLATE TYPE

FIG.18

| C/C GROUP | TIME VALUE COEFFICIENT | # OF EQUIPMENTS |
|---|---|---|
| 1) WIRE CUT ELECTRIC SPARK MACHINING | | |
| CHANGE-OVER TIME | ... | |
| MACHINING TIME | ... | 2 |
| 2) MACHINING CENTER | | |
| CHANGE-OVER TIME | ... | |
| MACHINING TIME | ... | 3 |
| 3) MILLING MACHINE | | |
| CHANGE-OVER TIME | ... | |
| MACHINING TIME | ... | 1 |
| 4) RADIAL DRILL | | |
| CHANGE-OVER TIME | ... | |
| MACHINING TIME | ... | 1 |
| 5) PLANE GRINDER | | |
| CHANGE-OVER TIME | ... | |
| MACHINING TIME | ... | 2 |
| 6) MOLDING GRINDER | | |
| CHANGE-OVER TIME | ... | |
| MACHINING TIME | ... | 1 |
| 7) LATHE | | |
| CHANGE-OVER TIME | ... | |
| MACHINING TIME | ... | 1 |
| 8) HAND TAP | | |
| CHANGE-OVER TIME | ... | |
| MACHINING TIME | ... | 1 |
| 9) NC MILLER | | |
| CHANGE-OVER TIME | ... | |
| MACHINING TIME | ... | 3 |
| 10) ELECTRIC SPARK | | |
| CHANGE-OVER TIME | ... | |
| MACHINING TIME | ... | 2 |

FIG.19

| COST CENTER | C/C CAPACITY | COST RATE OF EQ. & WPC (YEN/HOUR) | COST RATE OF LABOR & WPC (YEN/HOUR) | TOTAL (YEN/ HOUR) | COST RATE OF EQ. & WPC (YEN/SEC) | COST RATE OF LABOR & WPC (YEN/SEC) | TOTAL (YEN/ SEC) |
|---|---|---|---|---|---|---|---|
| MACHINING CENTER | SMALL | ... | ... | ... | ... | ... | ... |
| MACHINING CENTER | MEDIUM | ... | ... | ... | ... | ... | ... |
| MACHINING CENTER | LARGE | ... | ... | ... | ... | ... | ... |
| WIRE CUT ELECTRIC SPARK MACHINE | SMALL | ... | ... | ... | ... | ... | ... |
| WIRE CUT ELECTRIC SPARK MACHINE | LARGE | ... | ... | ... | ... | ... | ... |
| ELECTRIC SPARK MACHINE | SMALL | ... | ... | ... | ... | ... | ... |
| ELECTRIC SPARK MACHINE | LARGE | ... | ... | ... | ... | ... | ... |
| MILLER | SMALL | ... | ... | ... | ... | ... | ... |
| MILLER | MEDIUM | ... | ... | ... | ... | ... | ... |
| MILLING MACHINE | SMALL | ... | ... | ... | ... | ... | ... |
| MILLING MACHINE | LARGE | ... | ... | ... | ... | ... | ... |
| PLANE GRINDER | SMALL | ... | ... | ... | ... | ... | ... |
| PLANE GRINDER | LARGE | ... | ... | ... | ... | ... | ... |
| MOLDING GINDER | — | ... | ... | ... | ... | ... | ... |
| RADIAL DRILL | — | ... | ... | ... | ... | ... | ... |
| BENCH DRILL | — | ... | ... | ... | ... | ... | ... |
| HAND TAP | — | ... | ... | ... | ... | ... | ... |
| POLISHER | — | ... | ... | ... | ... | ... | ... |
| ASSEMBLER | (DIE SPOT & INVERSION) | ... | ... | ... | ... | ... | ... |
| ASSEMBLER | (HAND) | ... | ... | ... | ... | ... | ... |
| CAD/CAM/CAE | — | ... | ... | ... | ... | ... | ... |
| CNC LATHE | (CENTER-TO-CENTER 700MM) | ... | ... | ... | ... | ... | ... |
| MEASUREMENT | — | ... | ... | ... | ... | ... | ... |

FIG.20

| No. | MOLDED PRODUCT SIZE (L × W × H) | INSERT SIZE (L × W × H) | EQUIPMENT ||||||
|---|---|---|---|---|---|---|---|---|
| | | | MACHINING CENTER | NC MILLER | WIRE ELECTRIC SPARK | ELECTRIC SPARK | MILLING MACHINE | PLANE GRINDER |
| 1 | 112 × 90 × 15 | 112 × 100 × 12 | | | | | | |
| 2 | 176 × 110 × 18 | 186 × 120 × 23 | | | | | | |
| 3 | 215 × 150 × 18 | 225 × 160 × 14 | | | | | | |
| 4 | 215 × 150 × 35 | 225 × 160 × 27 | | | | | | |
| 5 | 215 × 150 × 60 | 225 × 160 × 45 | | | | | | |
| 6 | 250 × 180 × 23 | 260 × 190 × 18 | | | | | | |
| 7 | 250 × 180 × 45 | 260 × 190 × 34 | | | | | | |
| 8 | 345 × 220 × 33 | 355 × 230 × 25 | | | S | | S | |
| 9 | 345 × 220 × 65 | 335 × 230 × 49 | | S | | S | | |
| 10 | 385 × 260 × 65 | 400 × 275 × 34 | S | | | | | |
| 11 | 385 × 260 × 90 | 400 × 275 × 68 | | | | | | |
| 12 | 464 × 290 × 60 | 479 × 305 × 45 | | | | | | |
| 13 | 464 × 290 × 90 | 479 × 305 × 67.5 | | | | | | S |
| 14 | 464 × 290 × 120 | 479 × 305 × 90 | | | | | | |
| 15 | 620 × 350 × 65 | 640 × 370 × 49 | | | | | | |
| 16 | 620 × 350 × 97.5 | 640 × 370 × 73.5 | | | | | | |
| 17 | 620 × 350 × 130 | 640 × 370 × 98 | | | | | | |
| 18 | 770 × 430 × 75 | 790 × 450 × 57 | | | | | | |
| 19 | 770 × 430 × 112.5 | 790 × 450 × 85 | | | | | | |
| 20 | 770 × 430 × 150 | 790 × 450 × 83 | | | | | | |
| 21 | 860 × 510 × 85 | 880 × 530 × 64 | | | | | | |
| 22 | 860 × 510 × 127.5 | 880 × 530 × 96 | | | | | | |
| 23 | 860 × 510 × 170 | 880 × 530 × 128 | M | | | | | |
| 24 | 960 × 570 × 170 | 980 × 590 × 68 | | | | | | |
| 25 | 960 × 570 × 135 | 980 × 590 × 101.5 | | | L | | L | |
| 26 | 960 × 570 × 180 | 980 × 590 × 135 | | | | L | | |
| 27 | 1160 × 640 × 100 | 1180 × 660 × 75 | | | | | | |
| 28 | 1160 × 640 × 150 | 1180 × 660 × 112.5 | | | | | | |
| 29 | 1160 × 640 × 200 | 1180 × 660 × 150 | | M | | | | |
| 30 | 1320 × 810 × 125 | 1350 × 830 × 94 | | | | | | L |
| 31 | 1320 × 810 × 125 | 1350 × 830 × 141 | L | | | | | |
| 32 | 1320 × 810 × 250 | 1350 × 830 × 188 | | | | | | |
| 33 | 1530 × 1040 × 150 | 1560 × 1070 × 113 | | | | | | |
| 34 | 1530 × 1040 × 225 | 1560 × 1070 × 169 | | | | | | |
| 35 | 1530 × 1040 × 300 | 1560 × 1070 × 225 | | | | | | |

FIG.21A

| RANGE OF GEOMETRIC TOLERANCE | COEFFICIENT |
|---|---|
| 0 | ... |
| 1～4 | ... |
| 5～10 | ... |
| 11～ | ... |

FIG.21B

| GRADE OF SIZE | COEFFICIENT |
|---|---|
| GRADE 0 | ... |
| GRADE 1 AND LOWER | ... |

FIG.21C

| HARDENING | COEFFICIENT |
|---|---|
| WITHOUT HARDENING | ... |
| WITH HARDENING | ... |

FIG.21D

| APPEARANCE | POLISHING COEFFICIENT |
|---|---|
| TRANSPARENT | ... |
| APPEARANCE GRADE II, GRADE III | ... |
| STANDARD (OTHER THAN THE ABOVE) | ... |

FIG.22

| No. | PRODUCT TYPE | COEFFICIENT |
|---|---|---|
| 1 | INNER COVER | ... |
| 2 | BEARER | ... |
| 3 | END FENCE | ... |
| 4 | OPTICAL HOUSING | ... |
| 5 | GUIDE | ... |
| 6 | GUIDE PLATE | ... |
| 7 | COVER | ... |
| 8 | GEAR | ... |
| 9 | GAP | ... |
| 10 | PAPER-SIZE DETECTOR | ... |
| 11 | PAPER-SUPPLY TRAY | ... |
| 12 | CASE | ... |
| 13 | ROLL | ... |
| ... | ... | ... |
| ... | ... | ... |
| ... | ... | ... |
| ... | ... | ... |
| ... | ... | ... |
| ... | ... | ... |
| ... | ... | ... |

FIG.24

| SLIDE SIZE | | | MC | | PLANE GRINDING | | MOLDING GRINDER | | RB | | HAND TAP | | TOTAL TIME | |
|---|---|---|---|---|---|---|---|---|---|---|---|---|---|---|
| WIDTH | HEIGTH | DEPTH | CHANGE-OVER | PROCE-SSING | CHANGE-OVER | PROCE-SSING | CHANGE-OVER | PROCE-SSING | CHANGE-OVER | PROCE-SSING | CHANGE-OVER | PROCE-SSING | CHANGE-OVER | PROCE-SSING |
| 50 | 25 | 38 | ... | ... | ... | ... | ... | ... | ... | ... | ... | ... | ... | ... |
| 50 | 50 | 75 | ... | ... | ... | ... | ... | ... | ... | ... | ... | ... | ... | ... |
| 100 | 50 | 75 | ... | ... | ... | ... | ... | ... | ... | ... | ... | ... | ... | ... |
| 100 | 100 | 150 | ... | ... | ... | ... | ... | ... | ... | ... | ... | ... | ... | ... |
| 200 | 100 | 150 | ... | ... | ... | ... | ... | ... | ... | ... | ... | ... | ... | ... |
| 200 | 200 | 300 | ... | ... | ... | ... | ... | ... | ... | ... | ... | ... | ... | ... |
| 300 | 100 | 150 | ... | ... | ... | ... | ... | ... | ... | ... | ... | ... | ... | ... |
| 300 | 200 | 300 | ... | ... | ... | ... | ... | ... | ... | ... | ... | ... | ... | ... |
| 400 | 100 | 150 | ... | ... | ... | ... | ... | ... | ... | ... | ... | ... | ... | ... |
| 400 | 200 | 300 | ... | ... | ... | ... | ... | ... | ... | ... | ... | ... | ... | ... |
| 500 | 100 | 150 | ... | ... | ... | ... | ... | ... | ... | ... | ... | ... | ... | ... |
| 500 | 200 | 300 | ... | ... | ... | ... | ... | ... | ... | ... | ... | ... | ... | ... |

FIG.25

| LOOSE CORE | | MC | | MILLING MACHINE | | PLANE GRINDING | | MOLDING GRINDER | | WC | | TOTAL TIME | |
|---|---|---|---|---|---|---|---|---|---|---|---|---|---|
| WIDTH | DEPTH | CHANGE-OVER | PROCE-SSING | CHANGE-OVER | PROCE-SSING | CHANGE-OVER | PROCE-SSING | CHANGE-OVER | PROCE-SSING | CHANGE-OVER | PROCE-SSING | CHANGE-OVER | PROCE-SSING |
| 10 | 38 | ... | ... | ... | ... | ... | ... | ... | ... | ... | ... | ... | ... |
| 30 | 75 | ... | ... | ... | ... | ... | ... | ... | ... | ... | ... | ... | ... |
| 50 | 75 | ... | ... | ... | ... | ... | ... | ... | ... | ... | ... | ... | ... |
| 75 | 150 | ... | ... | ... | ... | ... | ... | ... | ... | ... | ... | ... | ... |
| 100 | 150 | ... | ... | ... | ... | ... | ... | ... | ... | ... | ... | ... | ... |
| 150 | 300 | ... | ... | ... | ... | ... | ... | ... | ... | ... | ... | ... | ... |
| 200 | 150 | ... | ... | ... | ... | ... | ... | ... | ... | ... | ... | ... | ... |
| 300 | 300 | ... | ... | ... | ... | ... | ... | ... | ... | ... | ... | ... | ... |
| 400 | 150 | ... | ... | ... | ... | ... | ... | ... | ... | ... | ... | ... | ... |

FIG.26

| | 1 PROJECTED AREA(mm2) | | | 1 MOLDING CAPACITY (ton) | 2 WIDTH (mm) | 3 LENGTH (mm) | 4 DEPTH OF PRODUCT(mm) | |
|---|---|---|---|---|---|---|---|---|
| | PC,PC + GLASS INNER WEIGHTING 450Kg/cm2 | PPE,PC ALLOY, GLASS INNER WEIGHTING 400Kg/cm2 | OTHERS INNER WEIGHTING 350Kg/cm2 | | | | 2-PLATE | 3-PLATE |
| | ⋮ | ⋮ | ⋮ | 1600 | ⋮ | ⋮ | ⋮ | ⋮ |
| | ⋮ | ⋮ | ⋮ | 1300 | 850 | 1620 | ⋮ | ⋮ |
| | ⋮ | ⋮ | ⋮ | 850 | ⋮ | ⋮ | 385 | 385 |
| | ⋮ | ⋮ | ⋮ | 650 | ⋮ | ⋮ | ⋮ | ⋮ |
| | 122000 | 137500 | 15700 | 550 | ⋮ | ⋮ | ⋮ | ⋮ |
| | ⋮ | ⋮ | ⋮ | 450 | ⋮ | ⋮ | ⋮ | ⋮ |
| | ⋮ | ⋮ | ⋮ | 350 | ⋮ | ⋮ | ⋮ | ⋮ |
| | ⋮ | ⋮ | ⋮ | 280 | ⋮ | ⋮ | ⋮ | ⋮ |
| | ⋮ | ⋮ | ⋮ | 220 | ⋮ | ⋮ | ⋮ | ⋮ |
| | ⋮ | ⋮ | ⋮ | 170 | ⋮ | ⋮ | ⋮ | ⋮ |
| | ⋮ | ⋮ | ⋮ | 100 | ⋮ | ⋮ | ⋮ | ⋮ |
| | ⋮ | ⋮ | ⋮ | 80 | ⋮ | ⋮ | ⋮ | ⋮ |
| | ⋮ | ⋮ | ⋮ | 55 | ⋮ | ⋮ | ⋮ | ⋮ |
| | ⋮ | ⋮ | ⋮ | 30 | ⋮ | ⋮ | ⋮ | ⋮ |
| | ⋮ | ⋮ | ⋮ | 18 | ⋮ | ⋮ | ⋮ | ⋮ |

FIG.27A

| WEIGHT (TONS) | ASSEMBLING/ADJUSTMENT BASIC TIME |
|---|---|
| ~55t | ... |
| ~100t | ... |
| ~280t | ... |
| ~650t | ... |
| ~1600t | ... |

FIG.27B

| RANGE OF GEOMETRIC TOLERANCE | GEOMETRIC TOLERANCE COEFFICIENT |
|---|---|
| 0 | ... |
| 1~4 | ... |
| 5~10 | ... |
| 11~ | ... |

FIG.27C

| SEVEREST SIZE GRADE | SIZE GRADE COEFFICIENT |
|---|---|
| GRADE 0 | ... |
| GRADE 1 AND LOWER | ... |

FIG.28

| COST CENTER | C/C CAPACITY | COST RATE OF EQ. & WPC (YEN/HOUR) | COST RATE OF LABOR & WPC (YEN/HOUR) | TOTAL (YEN/ HOUR) | COST RATE OF EQ. & WPC (YEN/SEC) | COST RATE OF LABOR & WPC (YEN/SEC) | TOTAL (YEN/ SEC) |
|---|---|---|---|---|---|---|---|
| MOLDING MACHINE | 18t | ... | ... | ... | ... | ... | ... |
| MOLDING MACHINE | 30t | ... | ... | ... | ... | ... | ... |
| MOLDING MACHINE | 55t | ... | ... | ... | ... | ... | ... |
| MOLDING MACHINE | 80t | ... | ... | ... | ... | ... | ... |
| MOLDING MACHINE | 100t | ... | ... | ... | ... | ... | ... |
| MOLDING MACHINE | 170t | ... | ... | ... | ... | ... | ... |
| MOLDING MACHINE | 220t | ... | ... | ... | ... | ... | ... |
| MOLDING MACHINE | 280t | ... | ... | ... | ... | ... | ... |
| MOLDING MACHINE | 350t | ... | ... | ... | ... | ... | ... |
| MOLDING MACHINE | 450t | ... | ... | ... | ... | ... | ... |
| MOLDING MACHINE | 550t | ... | ... | ... | ... | ... | ... |
| MOLDING MACHINE | 650t | ... | ... | ... | ... | ... | ... |
| MOLDING MACHINE | 850t | ... | ... | ... | ... | ... | ... |
| MOLDING MACHINE | 1300t | ... | ... | ... | ... | ... | ... |
| MOLDING MACHINE | 1600t | ... | ... | ... | ... | ... | ... |
| MOLDING MACHINE (WITH GLASS) | 18t | ... | ... | ... | ... | ... | ... |
| MOLDING MACHINE (WITH GLASS) | 30t | ... | ... | ... | ... | ... | ... |
| MOLDING MACHINE (WITH GLASS) | 55t | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |

FIG.29A

| MOLDING WEIGHT (TONS) | UNIT TIME OF TRY WORK | UNIT PROCESS OF TRY WORK |
|---|---|---|
| ~100t | ... | ... |
| ~280t | ... | ... |
| ~650t | ... | ... |
| ~1600t | ... | ... |

FIG.29B

| CONDITIONS | COUNTS OF TRY WORKS |
|---|---|
| WITH TEXTURING | ... |
| REQUIRING TECHNICAL TEST | ... |
| REQUIRING SUPPORT | ... |
| STANDARD (OTHER THAN THE ABOVE) | ... |

FIG.30A

| WEIGHT (tons) | PREPATION TIME |
|---|---|
| ~170t | ... |
| ~350t | ... |
| ~1600t | ... |

FIG.30B

| WEIGHT (tons) | MEASURING TIME |
|---|---|
| ~55t | ... |
| ~100t | ... |
| ~350t | ... |
| ~650t | ... |
| ~1600t | ... |

FIG.30C

| RNAGE OF GEOMETRIC TOLERANCE | GEOMETRIC TOLERANCE COEFFICIENT |
|---|---|
| 0 | ... |
| 1~4 | ... |
| 5~10 | ... |
| 11~ | ... |

FIG.30D

| SEVEREST SIZE GRADE | SIZE GRADE COEFFICIENT |
|---|---|
| GRADE 0 | ... |
| GRADE 1 AND LOWER | ... |

FIG.30E

| # OF PRODUCT PER SHOT | SHOT COEFFICIENT |
|---|---|
| 1 | ... |
| 2 | ... |
| 4 | ... |

FIG.30F

| CLASSIFICATION | COEFFICIENT |
|---|---|
| PART THAT REQUIRES SUPPORT AND TECHNICAL SEARCH | ... |
| STANDARD (OTHER THAN THE ABOVE) | ... |

FIG.31

| MOLDING MACHINE (tons) | # OF VALVE GATE SPOTS ||||||||| GATE DIAMETER |
| --- | --- | --- | --- | --- | --- | --- | --- | --- | --- | --- |
| | 1 | 2 | 3 | 4 | 5 | 8 | 16 | | | |
| 18 | ... | ... | ... | ... | — | — | — | | | |
| 30 | ... | ... | ... | ... | — | — | — | | | |
| 55 | ... | ... | ... | ... | — | — | — | | | |
| 80 | ... | ... | ... | ... | ... | ... | ... | | | |
| 100 | ... | ... | ... | ... | ... | ... | ... | | | |
| 170 | ... | ... | ... | ... | ... | ... | ... | | | |
| 220 | ... | ... | ... | ... | ... | ... | ... | | | |
| 280 | ... | ... | ... | ... | ... | ... | ... | | | |
| 350 | ... | ... | ... | ... | ... | ... | ... | | | |
| 450 | ... | ... | ... | ... | ... | ... | ... | | | |
| 550 | ... | ... | ... | ... | ... | ... | ... | | | |
| 650 | ... | ... | ... | ... | ... | ... | ... | | | |
| 850 | ... | ... | ... | ... | ... | ... | ... | | | |
| 1300 | ... | ... | ... | ... | ... | ... | ... | | | |
| 1600 | ... | ... | ... | ... | ... | ... | ... | | | |

FIG.32

| No. | MOLDED PRODUCT SIZE(mm) (LENGTH×WIDTH×HEIGHT) | GATE DIAMETER | UNIT PRICE OF INSERT MATERIAL (YEN/PIECE) | UNIT PRICE OF HARDENING (YEN/PIECE) | TOTAL COST (YEN/PIECE) | COST PER SPOT (YEN/SPOT) |
|---|---|---|---|---|---|---|
| 1 | 112×90×15 | ⋮ | ⋮ | ⋮ | ⋮ | ⋮ |
| 2 | 176×110×30 | ⋮ | ⋮ | ⋮ | ⋮ | ⋮ |
| 3 | 215×150×18 | ⋮ | ⋮ | ⋮ | ⋮ | ⋮ |
| 4 | 215×150×35 | ⋮ | ⋮ | ⋮ | ⋮ | ⋮ |
| 5 | 215×150×60 | ⋮ | ⋮ | ⋮ | ⋮ | ⋮ |
| 6 | 250×180×23 | ⋮ | ⋮ | ⋮ | ⋮ | ⋮ |
| 7 | 250×180×45 | ⋮ | ⋮ | ⋮ | ⋮ | ⋮ |
| 8 | 345×220×33 | ⋮ | ⋮ | ⋮ | ⋮ | ⋮ |
| 9 | 345×220×65 | ⋮ | ⋮ | ⋮ | ⋮ | ⋮ |
| 10 | 385×260×45 | ⋮ | ⋮ | ⋮ | ⋮ | ⋮ |
| 11 | ⋮ | ⋮ | ⋮ | ⋮ | ⋮ | ⋮ |
| 12 | ⋮ | ⋮ | ⋮ | ⋮ | ⋮ | ⋮ |
| ⋮ | ⋮ | ⋮ | ⋮ | ⋮ | ⋮ | ⋮ |

FIG.33

| No. | MOLDED PRODUCT SIZE(mm) (LENGTH × WIDTH × HEIGHT) | SPACER BLOCK MOLD SIZE | SPACER BLOCK LEFT AND RIGHT | COST | SPACER BLOCK TOP AND BOTTOM | COST | TOTAL COST |
|---|---|---|---|---|---|---|---|
| 1 | 112 × 90 × 15 | 180 × 150 × 80 | 180 × 28 × 80 | ⋮ | 94 × 28 × 80 | ⋮ | ⋮ |
| 2 | 176 × 110 × 30 | 250 × 180 × 80 | 250 × 33 × 80 | ⋮ | 114 × 33 × 80 | ⋮ | ⋮ |
| 3 | 215 × 150 × 18 | 300 × 250 × 80 | 300 × 48 × 80 | ⋮ | 154 × 48 × 80 | ⋮ | ⋮ |
| 4 | 215 × 150 × 35 | 300 × 250 × 80 | 300 × 48 × 80 | ⋮ | 154 × 48 × 80 | ⋮ | ⋮ |
| 5 | 215 × 150 × 60 | 300 × 250 × 80 | 300 × 48 × 80 | ⋮ | 154 × 48 × 80 | ⋮ | ⋮ |
| 6 | 250 × 180 × 23 | 350 × 300 × 80 | 350 × 58 × 80 | ⋮ | 184 × 58 × 80 | ⋮ | ⋮ |
| 7 | 250 × 180 × 45 | 350 × 300 × 80 | 350 × 58 × 80 | ⋮ | 184 × 58 × 80 | ⋮ | ⋮ |
| 8 | 345 × 220 × 33 | 450 × 350 × 80 | 450 × 63 × 80 | ⋮ | 224 × 63 × 80 | ⋮ | ⋮ |
| 9 | 345 × 220 × 65 | 450 × 350 × 80 | 450 × 63 × 80 | ⋮ | 224 × 63 × 80 | ⋮ | ⋮ |
| 10 | 385 × 260 × 45 | 500 × 400 × 80 | 500 × 68 × 80 | ⋮ | 264 × 68 × 80 | ⋮ | ⋮ |
| 11 | ⋮ | ⋮ | ⋮ | ⋮ | ⋮ | ⋮ | ⋮ |
| 12 | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

FIG.34

| MOLDED PRODUCT SIZE | | | MC | | ELECTRIC SPARK | | RB | | HAND TAP | | TOTAL TIME | |
|---|---|---|---|---|---|---|---|---|---|---|---|---|
| WIDTH | HEIGHT | DEPTH | CHANGE-OVER | PROCE-SSING | CHANGE-OVER | PROCE-SSING | CHANGE-OVER | PROCE-SSING | CHANGE-OVER | PROCE-SSING | CHANGE-OVER | PROCE-SSING |
| 112 | 90 | 15 | ... | ... | ... | ... | ... | ... | ... | ... | ... | ... |
| 176 | 110 | 30 | ... | ... | ... | ... | ... | ... | ... | ... | ... | ... |
| 215 | 150 | 18 | ... | ... | ... | ... | ... | ... | ... | ... | ... | ... |
| 215 | 150 | 35 | ... | ... | ... | ... | ... | ... | ... | ... | ... | ... |
| 215 | 150 | 60 | ... | ... | ... | ... | ... | ... | ... | ... | ... | ... |
| 250 | 180 | 23 | ... | ... | ... | ... | ... | ... | ... | ... | ... | ... |
| 250 | 180 | 45 | ... | ... | ... | ... | ... | ... | ... | ... | ... | ... |
| ... | ... | ... | ... | ... | ... | ... | ... | ... | ... | ... | ... | ... |
| ... | ... | ... | ... | ... | ... | ... | ... | ... | ... | ... | ... | ... |
| ... | ... | ... | ... | ... | ... | ... | ... | ... | ... | ... | ... | ... |
| ... | ... | ... | ... | ... | ... | ... | ... | ... | ... | ... | ... | ... |
| ... | ... | ... | ... | ... | ... | ... | ... | ... | ... | ... | ... | ... |

FIG.35

| # OF GATE SPOTS | INTEGRATION TIME | WIRING TIME | TOTAL TIME |
|---|---|---|---|
| 1 | ... | ... | ... |
| 2 | ... | ... | ... |
| 3 | ... | ... | ... |
| 4 | ... | ... | ... |
| 5 | ... | ... | ... |
| 8 | ... | ... | ... |
| 16 | ... | ... | ... |

FIG.36

| EQUIPMENT (tons) | 18 | 30 | 55 | 80 | 100 | 170 | 220 | 280 |
|---|---|---|---|---|---|---|---|---|
| WEIGHT (GRAMS) | ... | ... | ... | ... | ... | ... | ... | ... |
| EQUIPMENT (tons) | 350 | 450 | 550 | 650 | 850 | 1,300 | 1,600 | |
| WEIGHT (GRAMS) | ... | ... | ... | ... | ... | ... | ... | |

FIG.37

| CONDITIONS | DEFECT COEFFICIENT | RECYCLED MATERIAL CONTENT COEFFICIENT |
|---|---|---|
| APPEARANCE GRADE I AND II TRANSPARENT MATERIAL GLASS-CONTAINING MATERIAL HOT RUNNER | 1.01 | 1.03 |
| APPEARANCE GRADE III LOW FOAMING MATERIAL | ... | ... |
| OTHER THAN THE ABOVE | ... | ... |

FIG.39

| | | INJECTION MOLDING MACHINE (TONS) | | | | | | | | | | | | | |
|---|---|---|---|---|---|---|---|---|---|---|---|---|---|---|---|
| | | 18 | 30 | 55 | 80 | 100 | 170 | 220 | 280 | 350 | 450 | 550 | 650 | 850 | 1300 | 1600 |
| NET OF MOLDING MACHINE CHANGE-OVER TIME | TIME | ... | ... | ... | ... | ... | ... | ... | ... | ... | ... | ... | ... | ... | ... | ... |
| | PROCESS | ... | ... | ... | ... | ... | ... | ... | ... | ... | ... | ... | ... | ... | ... | ... |
| NET OF MOLDING MACHINE CHANGE-OVER TIME (FOR ADDING HOT RUNNER) | TIME | ... | ... | ... | ... | ... | ... | ... | ... | ... | ... | ... | ... | ... | ... | ... |
| | PROCESS | ... | ... | ... | ... | ... | ... | ... | ... | ... | ... | ... | ... | ... | ... | ... |
| NET OF BASIC MOLDING TIME | | ... | ... | ... | ... | ... | ... | ... | ... | ... | ... | ... | ... | ... | ... | ... |
| SLIDE TIME | | ... | ... | ... | ... | ... | ... | ... | ... | ... | ... | ... | ... | ... | ... | ... |
| SEMIAUTOMATIC | MOLDING INSERT NET TIME | ... | ... | ... | ... | ... | ... | ... | ... | ... | ... | ... | ... | ... | ... | ... |
| | TIME VALUE COEFFICIENT | ... | ... | ... | ... | ... | ... | ... | ... | ... | ... | ... | ... | ... | ... | ... |
| | # OF EQUIPMENTS | ... | ... | ... | ... | ... | ... | ... | ... | ... | ... | ... | ... | ... | ... | ... |
| | AUTO-HAND | ... | ... | ... | ... | ... | ... | ... | ... | ... | ... | ... | ... | ... | ... | ... |
| AUTO-HAND | AUTO-HAND CHANGE-OVER NET TIME | TIME | ... | ... | ... | ... | ... | ... | ... | ... | ... | ... | ... | ... | ... | ... | ... |
| | | PROCESS | ... | ... | ... | ... | ... | ... | ... | ... | ... | ... | ... | ... | ... | ... | ... |
| | AUTO-HAND ADDING NET TIME | ... | ... | ... | ... | ... | ... | ... | ... | ... | ... | ... | ... | ... | ... | ... |
| | TIME VALUE COEFFICIENT | ... | ... | ... | ... | ... | ... | ... | ... | ... | ... | ... | ... | ... | ... | ... |
| | # OF EQUIPMENTS | ... | ... | ... | ... | ... | ... | ... | ... | ... | ... | ... | ... | ... | ... | ... |
| AUTOMATIC FALL | TIME VALUE COEFFICIENT | ... | ... | ... | ... | ... | ... | ... | ... | ... | ... | ... | ... | ... | ... | ... |
| | # OF EQUIPMENTS | ... | ... | ... | ... | ... | ... | ... | ... | ... | ... | ... | ... | ... | ... | ... |

FIG.40A

SIZE GRADE COEFFICIENT

| GRADE 0 | OTHER THAN GRADE 0 |
|---|---|
| ... | 0 |

FIG.40B

GEOMETRIC TOLERANCE COEFFICIENT
(DESIGNATED RANGE)

| 0 | 1~4 | 5~10 | 11~ |
|---|---|---|---|
| 0 | ... | ... | ... |

FIG.40C

PLATE THICKNESS COEFFICIENT

| t<3mm | 3≦t≦4mm | 4mm<t |
|---|---|---|
| 0 | ... | ... |

FIG.40D

MATERIAL QUALITY COEFFICIENT

| LOW FOAMING MATERIAL | PC (INCLUDING ALLOY), PA, PE, OR GLASS-CONTAINING | OTHERS |
|---|---|---|
| ... | ... | 0 |

FIG.40E

GEAR ADDITIONAL TIME

|  | 3 | 4 | → |
|---|---|---|---|
| SPUR GEAR | ... | ... | ... |
| HELICAL GEAR | ... | ... | ... |

FIG.40F

HOT RUNNER COEFFICIENT

| C<170 tons | 170≦C<550 tons | C≧550 tons |
|---|---|---|
| ... | ... | ... |

FIG.41

| COST CENTER | C/C ABILITY | COST RATE OF EQ. & WPC (YEN/HOUR) | COST RATE OF LABOR & WPC (YEN/HOUR) | TOTAL (YEN/ HOUR) | COST RATE OF EQ. & WPC (YEN/SEC) | COST RATE OF LABOR & WPC (YEN/SEC) | TOTAL (YEN/ SEC) |
|---|---|---|---|---|---|---|---|
| HOT STAMP | — | ⋮ | ⋮ | ⋮ | ⋮ | ⋮ | ⋮ |
| PRESS INJECTION | — | ⋮ | ⋮ | ⋮ | ⋮ | ⋮ | ⋮ |
| BEARING INJECTION | — | ⋮ | ⋮ | ⋮ | ⋮ | ⋮ | ⋮ |
| ULTRASONIC INSERT | — | ⋮ | ⋮ | ⋮ | ⋮ | ⋮ | ⋮ |
| HOT INSERT | — | ⋮ | ⋮ | ⋮ | ⋮ | ⋮ | ⋮ |
| ULTRASONIC WELDING | — | ⋮ | ⋮ | ⋮ | ⋮ | ⋮ | ⋮ |
| SILK PRINTING | MANUAL | ⋮ | ⋮ | ⋮ | ⋮ | ⋮ | ⋮ |
| GATE CUT | SIDE GATE | ⋮ | ⋮ | ⋮ | ⋮ | ⋮ | ⋮ |
| GATE CUT | JUMP GATE | ⋮ | ⋮ | ⋮ | ⋮ | ⋮ | ⋮ |
| HEAT CAULKING | — | ⋮ | ⋮ | ⋮ | ⋮ | ⋮ | ⋮ |
| PLASTIC PACKAGING | — | ⋮ | ⋮ | ⋮ | ⋮ | ⋮ | ⋮ |
| EXTERIOR CLEANING | — | ⋮ | ⋮ | ⋮ | ⋮ | ⋮ | ⋮ |

FIG.42

| | | CHANGE-OVER TIME [SEC] | PROCESSING TIME [SEC] UPPER ROW: FIRST SPOT LOWER ROW: SECOND AND SUBSEQUENT | | | TIME VALUE COEFFICIENT |
|---|---|---|---|---|---|---|
| | | | LENGTH OF MOLDED PRODUCT | | | |
| | | | ~150mm | 151mm~350mm | 351mm~ | |
| INSERT | PRESS INJECTION | 300 | ⋮ ⋮ | ⋮ ⋮ | ⋮ ⋮ | ⋮ |
| | BEARING INJECTION | 300 | ⋮ ⋮ | ⋮ ⋮ | ⋮ ⋮ | ⋮ |
| | HOT INSERT | 300 | ⋮ ⋮ | ⋮ ⋮ | ⋮ ⋮ | ⋮ |
| | ULTRASONIC INSERT | 300 | ⋮ ⋮ | ⋮ ⋮ | ⋮ ⋮ | ⋮ |
| HEAT CAULKING | | 300 | ⋮ ⋮ | ⋮ ⋮ | ⋮ ⋮ | ⋮ |
| GATE CUT (SIDE GATE) | | 0 | ⋮ ⋮ | ⋮ ⋮ | ⋮ ⋮ | ⋮ |
| GATE CUT (JUMP GATE) | | 0 | ⋮ ⋮ | ⋮ ⋮ | ⋮ ⋮ | ⋮ |

FIG.43

| | CHANGE-OVER TIME [SEC] | PROCESSING TIME [SEC] | | | TIME VALUE COEFFICIENT |
|---|---|---|---|---|---|
| | | LENGTH OF MOLDED PRODUCT | | | |
| | | ~150mm | 151mm~350mm | 351mm~ | |
| HOT STAMP | 1410 | ... | ... | ... | ... |
| SILK PRINTING (MANUAL) | 900 | ... | ... | ... | ... |
| PLASTIC PACKAGING | 00 | ... | ... | ... | ... |
| ULTRASONIC WELDING | 300 | ... | ... | ... | ... |
| EXTERIOR CLEANING | 0 | ... | ... | ... | ... |

FIG.44

MOLD COST ESTIMATION LIST

PART # [A] [...] PRODUCTION BASE [JAPAN]
PART NAME [LEVER:PRESSURIZED:SUB]

TOTAL LOTS [...] # OF PLATES [ ] # OF PRODUCT PER SHOT [ ] EQUIPMENT USED [MOLDING 55t (GOLD)]

CLOSE
PRINT (HARD COPY)

COST OF MOLD [ ] YEN

- MATERIAL — * [...]
- NITRIDING (HARDENING) — * [...]
- TEXTURING — * [...]
- ENGRAVING — * [...]
- DESIGN/PROGRAMMING — * [...] [h]
- PROCESSING — * [...] [h] ┬ FIXED PART PROCESSING COST  * [...] [h]
                               ├ VARIABLE PART PROCESSING COST  * [...] [h]
                               ├ SLIDE CORE PROCESSING COST  0 * 0.00 [h]
                               └ LOOSE CORE PROCESSING COST  0 * 0.00 [h]
- POLISHING — * [...] [h]
- ASSEMBLE & ADJUSTMENT — * [...] [h]
- TRY — * [...] [h]
- MEASUREMENT — * [...]
- TRY MATERIAL — * [...]
- MATERIAL MANAGEMENT — * [...]
- GENERAL MANAGEMENT/SALE — * [...]
- PROFIT — * [...]
- HOT RUNNER — * [...]

<MATERIAL/PROCESSING BREAKDOWN>

| | ELEMENT NAME | LENGTH | WIDTH | DEPTH | NUMBER | NITRIDING (HARDENING) COST | MATERIAL COST |
|---|---|---|---|---|---|---|---|
| 1 | MOLD BASE | ... | ... | ... | 0 | | ... |
| 2 | PURCHASED STANDARDIZED ARTICLE | | | | 0 | | ... |
| 3 | INSERT | ... | ... | ... | 0 | | ... |
| 4 | | | | | | | |
| 5 | | | | | | | |
| 6 | | | | | | | |
| 7 | | | | | | | |
| 8 | | | | | | | |

FIG.45A

MOLDED PRODUCT ESTIMATION LIST

| PART # | A ... | SUFFIX | A | ASSESSMENT # | 1 | PRODUCTION BASE | JAPAN | PART NAME | LEVER:PRESSURIZED:SUB | | CLOSE |
|---|---|---|---|---|---|---|---|---|---|---|---|
| UNIT COST OF PART | 9.75 ¥ | WORK LOT | ... | PIECES/MONTH | | | | | | | PRINT (HARD COPY) |

<MATERIAL INFORMATION>

| MATERIAL COST | ... ¥ | | | | | SUB-PART COST | ... ¥ | | |
|---|---|---|---|---|---|---|---|---|---|
| MATERIAL QUALITY | DURACON S...N... | | | | | | | | |
| UNIT PRICE OF MATERIAL | ... ¥ | SPOOL RUNNER WEIGHT | ... ¥ | STANDARD AMOUNT OF MATERIAL IN USE | ... ¥ | TARGET OF MANAGEMENT | PART # | COST UNIT PRICE | # OF PIECES | AMOUNT |
| PRODUCT WEIGHT | ... ¥ | | | | | | | | | |
| WEIGHT OF SUBSTITUTED MATERIAL | ... ¥ | WEIGHT OF RECYCLED MATERIAL | ... ¥ | APPEARANCE GRADE | ... ¥ | | | | | |

<PROCESSING INFORMATION>

PROCESSING COST  ... ¥

| | PROCESS | DESIGNATED COST CENTER | CHANGE-OVER COST | REQUIRED TIME | COST RATE OF EQ. & WPC | # OF PROCESS | COST RATE OF LABOR & WPC | PROCESSING COST |
|---|---|---|---|---|---|---|---|---|
| 1 | MOLDING | MOLDING 55T (COLD) | ... | | ... | ... | ... | ... |
| 2 | | | | | | | | |
| 3 | | | | | | | | |
| 4 | | | | | | | | |
| 5 | | | | | | | | |
| 6 | | | | | | | | |

FIG.46

<CAD TYPE SELECTION>
○ Σ-M SYSTEM  ● RAMDA SYSTEM  ○ MCAD SYSTEM  ○ CAD NOT USED
PART #  [  ]  SUFFIX [  ]    [ CAD INFORMATION ACQUIRED ]

<NECESSARY INPUT ITEMS>
PRODUCT TYPE [        ▶] OTHERS [        ]
MONTHLY LOT [12,000] PIECES/MONTH   TOTAL LOTS [288,000]

<CAD ACQUIRED INFORMATION>
PART NAME [                    ]
OF MOLDING INSERTS [  ]  GRADE OF APPEARANCE [NOT SPECIFIED ▶]  AVERAGE THICKNESS [  ] mm

<PRODUCT SIZE>
LENGTH [  ] mm  WIDTH [  ] mm  DEPTH [  ] mm
VOLUME [  ] mm3  WEIGHT [  ] g

[ CAD INFORMATION REFLECTION ]
[ CANCEL ]
[ HELP ]

INJECTION-MOLDING COST ESTIMATION SYSTEM

BACKGROUND OF THE INVENTION

1. Field of the Invention

The present invention generally relates to a cost estimation system for an injection-molded product, and more particularly, to a cost estimation system that can estimate a cost required to fabricate a mold, as well as a total cost required to manufacture an injection-molded product.

2. Description of the Related Art

An estimation system for automatically calculating an estimated sum of an injection-molded product has been known. With such a system, upon input of selected fabrication conditions, the total cost of the injection-molded product is automatically estimated.

However, there is no system existing that can estimate not only an injection-molded product cost, but also a cost of mold itself used in the injection molding process. There are many complicated factors in estimating the costs of a mold that directly affect the estimated sum. Especially, it takes time to estimate the processing (or machining) cost of a so-called variable part of the mold, which varies case by case and characterizes the shape of the injection-molded product. In addition, the estimation of the variable part processing cost is likely to vary depending on the estimator.

Under these situations, demand for a system that can estimate the costs of a mold, as well as the costs of a molded product, when fabrication conditions of the molded product are selected, has been increasing.

SUMMARY OF THE INVENTION

Therefore, it is an object of the present invention to provide a system that can promptly output a cost estimation for a mold used in an injection molding process in a reliable manner upon designation of fabrication conditions of a molded product.

To achieve the object, in one aspect of the invention, an estimation system for estimating an injection-molding related cost is provided. The estimation system comprises:
(a) an input unit;
(b) a storage that stores a mold estimation function for each of cost items of a mold used to produce a molded product, and a mold estimation reference value table for recording mold estimation reference values in association with prescribed conditions;
(c) a data processing unit that acquires a fabrication condition of the molded product through the input unit, reads the mold estimation function and one of the mold estimation reference values from the storage corresponding to the fabrication condition, and estimates a cost of the mold based on the mold estimation function and the selected mold estimation reference value; and
(d) an output unit for outputting a mold cost estimation result made by the data processing unit.

The data processing unit estimates each of the cost items separately using the corresponding mold estimation function and the mold estimation reference value, and then sums up estimated amounts of the cost items of the mold to determine a total amount of cost estimation of the mold.

The output unit can output the estimated amounts of the individual cost items of the mold, together with the total amount of the cost estimation of the mold.

The storage also stores images of multiple types of molded products and default values of the mold estimation reference values for each type of molded product. In this case, the output unit displays the images of the molded products and allows one of the images to be selected through the input unit.

When one of the images is selected, the data processing unit reads the default values corresponding to the selected image together with the associated mold estimation function from the storage to estimate the cost of the mold used to produce the molded product of the selected image.

The above-described mold estimation function is used to estimate processing cost of a variable part of the mold that characterizes the shape of the molded product.

The mold estimation function is, for example, a formula expressing a variable part processing time required to process the variable part of the mold. The data processing unit calculates the processing cost of the variable part of the mold by multiplying a fixed part average cost rate by the variable part processing time.

The mold estimation reference value includes a molded product coefficient defining the type of the molded product to be produced, a geometric tolerance coefficient defining the range of a geometric tolerance, a size grade coefficient defining classification of the size of the molded product, and a hardening coefficient defining whether a hardening process is required; and the formula is expressed as $$\text{Variable Part Processing Time} = C*(V*N)^{1/2}*Cp*(1+Cg+Cs)*(1+Ch) \qquad (1)$$

where C denotes an estimation coefficient, V denotes the volume of the molded product, N denotes the number of molded products taken per shot, Cp denotes the molded product coefficient, Cg denotes the geometric tolerance coefficient, Gs denotes the size grade coefficient, and Ch denotes the hardening coefficient.

This system can also estimate the molded product produced using the above-described mold. In this case, the storage further stores a molded product estimation function for each of cost items of the molded product and a molded product estimation reference value table for recording molded product estimation reference values in association with molded product fabrication conditions. The data processing unit reads the molded product estimation function and one of the molded product estimation reference values corresponding to one of the molded product fabrication conditions designated through the input unit from the storage, and estimates cost of the molded product based on the molded product estimation function and the molded product estimation reference value. The output unit outputs a cost estimation result of the molded product made by the data processing unit.

BRIEF DESCRIPTION OF THE DRAWINGS

Other objects, features, and advantages of the present invention will become more apparent from the following detailed description when read in conjunction with the accompanying drawings, in which:

FIG. 4 illustrates an example of the material information input screen;

FIG. 5 illustrates an example of the comprehensive process setting screen;

FIG. 6 illustrates an example of the selected process information input screen;

FIG. 7 illustrates an example of the mold information input screen;

FIG. 8 illustrates an example of the price table of mold bases and purchased standardized articles;

FIG. 9 illustrates an example of the molded product size selection table;

FIG. 10 illustrates an example of the price table of slide core steel materials and purchased standardized articles;

FIG. 11 illustrates an example of the price table of loose core steel materials and purchased standardized articles;

FIG. 12 illustrates an example of the loose core material height table;

FIG. 13 illustrates an example of the mold material setting table for several materials of molded products;

FIG. 14 illustrates an example of the slide core nitriding cost table;

FIG. 15 illustrates an example of the loose core nitriding cost table;

FIG. 16 illustrates an example of the symbol unit price table;

FIG. 17 illustrates an example of the fixed part processing net time calculation table;

FIG. 18 illustrates an example of the time value coefficient table for each cost center;

FIG. 19 illustrates an example of the c/c (cost center) processing cost rate sum-up table for mold machining;

FIG. 20 illustrates an example of the equipment capability selection table;

FIG. 21 illustrates several coefficient tables relating to the variable part processing cost;

FIG. 22 illustrates an example of the product type coefficient table;

FIG. 24 illustrates an example of the processing time determination table based on slide size;

FIG. 25 illustrates an example of the processing time determination table based on loose core size;

FIG. 26 illustrates an example of the molding machine capability selecting table;

FIG. 27 illustrates several coefficient tables relating to the assembling and adjustment cost;

FIG. 28 illustrates an example of the c/c (cost center) processing cost rate sum-up table for primary molding process;

FIG. 29 illustrates several coefficient tables relating to the trial cost;

FIG. 30 illustrates time value tables and various coefficient tables;

FIG. 31 illustrates an example of the hot runner/system cost table;

FIG. 32 illustrates an example of the insert hardening cost table;

FIG. 33 illustrates an example of the cost table of hot runner spacer block material cost table;

FIG. 34 illustrates an example of the hot runner net time determination table;

FIG. 35 illustrates an example of the hot runner integration/wiring time determination table;

FIG. 36 illustrates an example of the changed material weight table;

FIG. 37 illustrates an example of the table of defect coefficient and recycled material content coefficient;

FIG. 39 illustrates an example of the process time determination table for a molding machine;

FIG. 40A-F illustrate several coefficient tables relating to the processing cost of the molded product;

FIG. 41 illustrates an example of the c/c (cost center) processing cost rate sum-up table for a molding secondary process;

FIG. 42 illustrates an example of the time value table of the secondary process, which is used when the designation of the processing spot is available;

FIG. 43 illustrates an example of the time value table of the secondary process, which is used when the designation of the processing spot is unavailable;

FIG. 44 illustrates an example of the mold cost output screen;

FIG. 46 illustrates an example of the CAD information input screen; and

DETAILED DESCRIPTION OF THE EMBODIMENTS

The details of the present invention will now be described with reference to the attached drawings.

Figure 1:
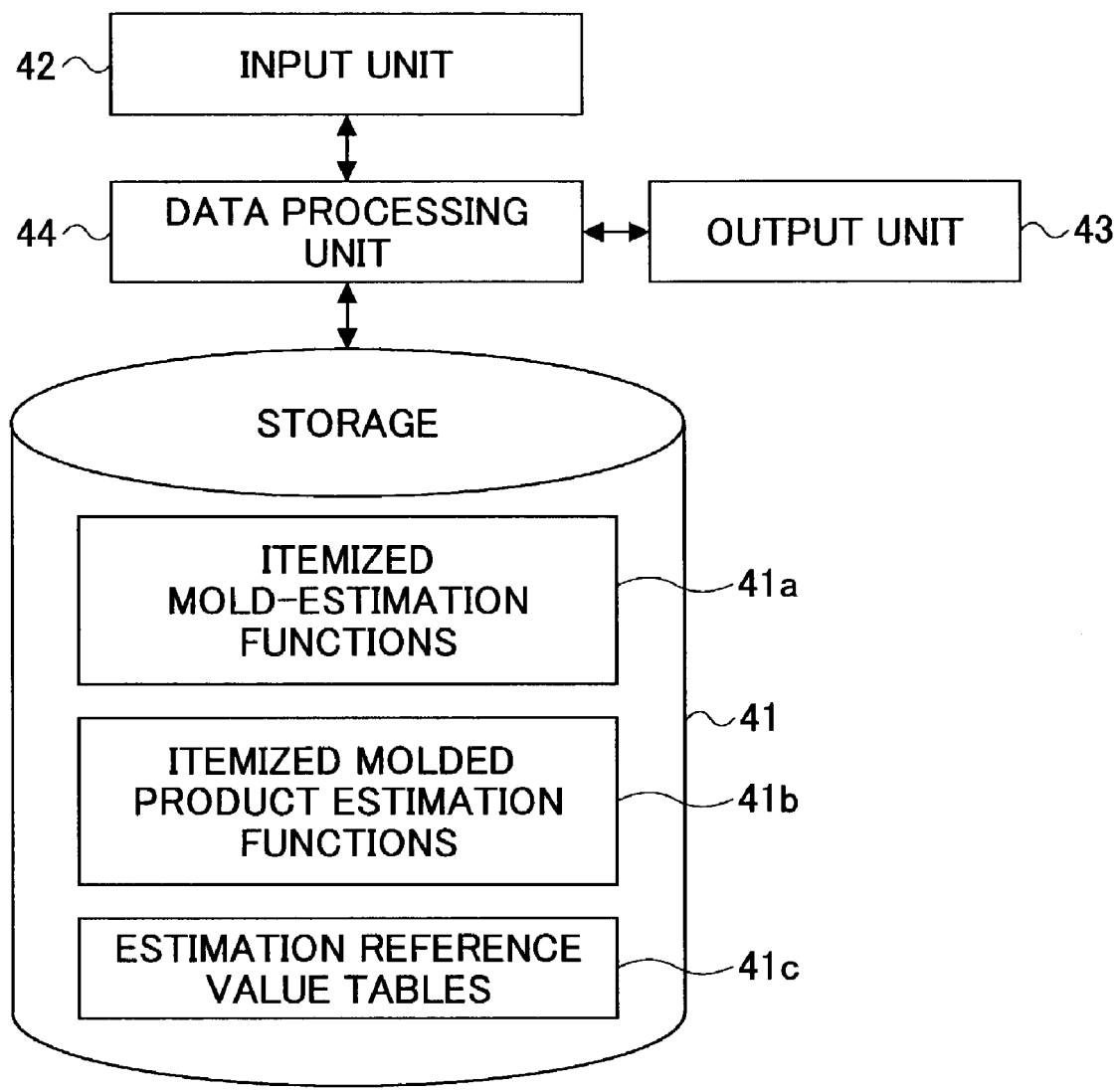
FIG. 1 is a block diagram illustrating the overall structure of a cost estimation system according to an embodiment of the present invention.

FIG. 1 is a block diagram showing the overall structure of the estimation system according to an embodiment of the invention. The estimation system comprises data storage 41, a data input unit 42, a data output unit 43, and a data processing unit 44.

The data storage 41 includes main memory and a hard disk, and it is not necessarily a single unit.

The hard disk of the storage 41 stores estimation programs that cause the data processing unit 44 to carry out the estimation operations. The estimation program is appropriately loaded in the main memory so as to be executed by the data processing unit 44. The hard disk of the storage 41 also stores a set of itemized mold estimation functions 41a and a set of itemized molded product estimation functions 41b. These functions are expressed as predetermined formulas, and used to calculate the total cost of a mold and the total cost of a molded product.

In general, when estimating the total cost of a product, each item required to form the product is estimated individually, and then the estimated amounts of all items are summed up. Accordingly, in the embodiment, the cost of a mold and the cost of a molded product are broken down into various items, and the estimation function of each item of the mold and the estimation function of each item of the molded product are-stored in the storage 41. The detains of these estimation functions are explained below.

The hard disk of the storage 41 also stores a set of estimation reference value tables 41c. In the estimation reference tables 41c, estimation reference values are recorded in association with fabrication conditions of an injection-molded product. An estimation reference value is a parameter that is to be input to the mold estimation function and/or the molded product estimation function. The fabrication conditions are defined by fabrication condition values input through the fabrication condition input screen of the input unit 42, which is also described in detail below.

There are three types of estimation reference value tables, namely, a table with those parameters that are to be input to the mold estimation functions, a table with those parameters that are to be input to the molded product estimation functions, and a table with those parameters that are to be input to both the mold estimation function and the molded product estimation function. How the estimation reference values recorded in the tables are used to calculate the cost of what items will be described later in conjunction with the operation of the cost estimation system.

The input unit 42 includes, for example, a keyboard, a pointing device, and other input devices. The output unit 43 is, for example, a computer display. The data processing unit 44 includes a CPU. It may also include multiple computing units that carry out distributed processing.

The data processing unit 44 loads the program stored in the hard disk of the storage 41 in the memory to execute it.

Figure 2:
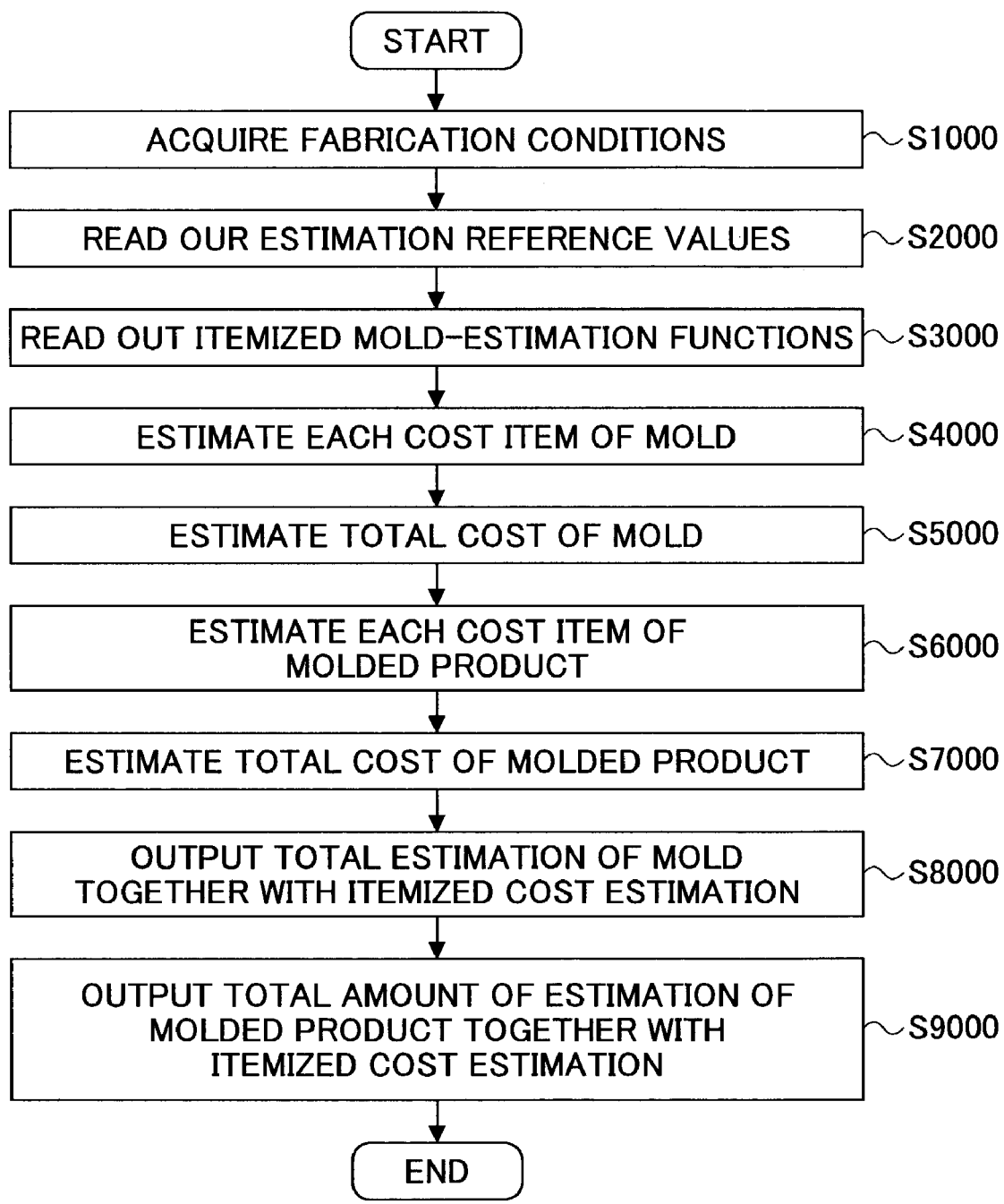
FIG. 2 is a flowchart showing the basic operations of the estimation system according to an embodiment of the present invention.

FIG. 2 is a flowchart showing the basic operations carried out by the data processing unit 44. First, the data processing unit 44 acquires necessary fabrication conditions designated by an operator for a particular injection-molded product (step S1000). The fabrication conditions are designated by inputting or selecting appropriate values in input boxes of the fabrication condition input screen displayed on the output unit 43. The fabrication condition input screen is illustrated in FIG. 3 through FIG. 7.

Figure 3:
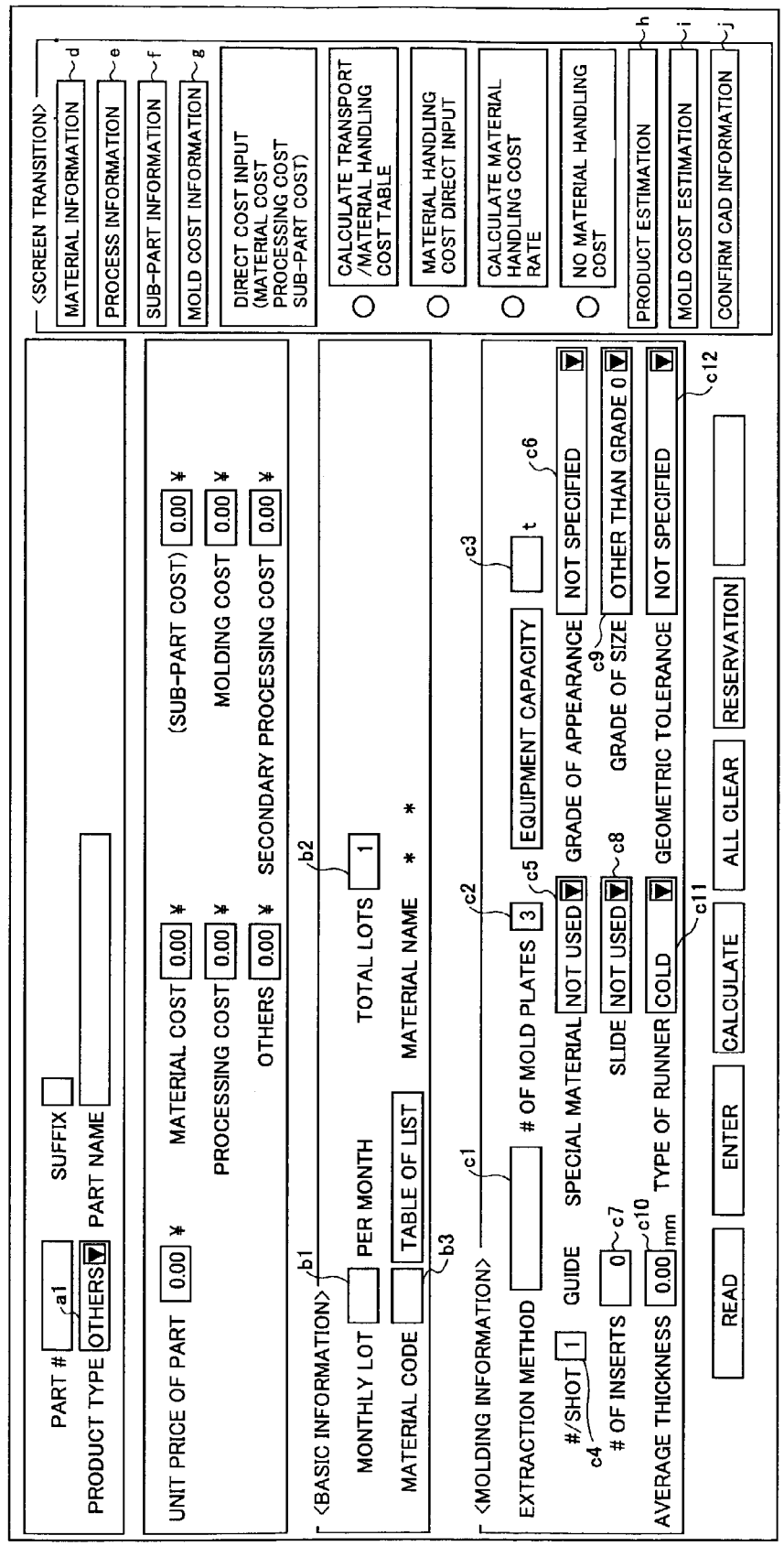
FIG. 3 illustrates an example of the main screen of the fabrication condition input screen.

FIG. 3 shows the main screen of the fabrication condition input screens, which has input boxes of major fabrication conditions. A product type can be selected from the pull-down menu of the product type input box a1. The available product type includes holder, link, handle, lever, stage, duct, tray, side fence, etc. From the monthly lot input box b1, monthly production of the molded product under the estimation is input. The total lot number of the molded product is input from the total lot number input box b2. The material code input box b3 allows the operator to input the material code of the molded product. The list button of the material code input box may be selected, from which the operator can select a desired material code. The material list is connected to an external database, and the operator can select a material from a wide variety of material codes covering general-purpose material codes, such as ABS, PS, and PE, to engineering plastic material codes, such as PC, POM, PA, and PPE.

The extraction method indication box c1 indicates how the molded product is taken out of the mold. The extraction method is determined from information of other items, and therefore, the operator or the estimator cannot input to this box. The determination of the extraction method is explained below. The mold plate type input box c2 allows the operator to select a two-plate type mold or a three-plate type mold. The equipment capacity indication box c3 indicates the capacity of the equipment to which the selected mold is attached This item is also determined from information of other items, similarly to the extraction method, and therefore, the operator or the estimator cannot input to this box. The input box c4 allows the operator to input the number of molded products fabricated by one shot using the mold under the estimation.

The special material input box c5 allows the operator to designate the material of the molded product among "not specified", "low foaming", "glass-containing", and "transparent". The appearance grade input box c6 allows the operator to select the grade of the appearance of the molded product to be estimated. The input box c7 is used to input the number of inserts buried in the molded product. The slide input box c8 allows the operator to select "used" or "not used". The size grade input box c9 allows the operator to designate the grade of the size between "grade 0" and "other than grade 0". The average thickness input box c10 is used to input the average thickness of the molded product to be estimated. The runner type input box c11 allows the operator to select either "cold runner" or "hot runner". The geometric tolerance designation box c12 allows the operator to select the range of the geometric tolerance among from "not specified", "1 to 4", "5 to 10 ", "11 and greater".

If the material information button d is selected in the main screen of FIG. 3, the screen shifts to the material information screen, which is shown in FIG. 4. In this material information screen, the product size input box d1 allows the operator to input the dimensions (the length, the width, and the depth) of the molded product that is to be estimated. The product volume input box d2 is a box for inputting the volume of the molded product to be estimated. The product weight input box d3 is a box for inputting the weight of the molded product. The spool runner weight input box is a box for inputting the weight of the spool runner required to mold the product. The operator may directly input a certain value in this box, or alternatively, the value calculated from the weight of the molded product and the past record may be automatically indicated. The example of FIG. 4 shows a value automatically calculated on the condition that the ratio of the spool runner is 30.5%.

The projected area input box d7 is a box for inputting the projected area of the molded product. The operator may directly input a value, or alternatively, the product of the length and the width of the molded product may be automatically indicated in this box. Under the projected area input box d7 is shown the appearance grade selected by the operator through the input box c6 of the main screen shown in FIG. 3. The JGMA grade input box d8 allows the operator to select a JGMA grade. The gear teeth input box d9 allows the operator to select either "YES" or "NO", which represent whether or not the gear teeth are present or absent. The gear type input box d10 allows the operator to select either "spur gear" or "helical gear", and to input the number of gear steps corresponding to the selected gear type.

When the process selection button e is selected in the main screen shown in FIG. 3, the screen is shifted to the comprehensive process setting screen, which is shown in FIG. 5. In this screen, the operator can input the number of processes required to fabricate the molded product to be estimated. Upon input of the necessary number of processes and hitting of the "OK" button on the top right of this screen, the screen shifts to the selected process information input screen, which is shown in FIG. 6. The selected process information input screen indicates the information about the processes having a value other than "0" in the comprehensive process setting screen of FIG. 5. There is a spot number input box next to each of the selected processes, in which the operator can input the number of spots that are to be subjected to the selected process using the input unit 42.

When the sub-part information button f is selected in the main screen shown in FIG. 3, the screen is shifted to the sub-part information input screen (not shown). The sub-part information input screen has input boxes of the sub-part number, the suffix, the unit price, the target management, the number of sub-parts to be used, etc. The detailed explanation for them will be omitted.

When the mold cost information button g is selected in the main screen of FIG. 3, the screen is shifted to the mold information input screen, which is shown in FIG. 7. This screen includes the slide core information input box g1, in which the operator selects the size (defined by the width, the height, and the depth) of the slide core provided to the molded product, and the number of slide cores to be used for each size. The loose core information input box g2 allows the operator to select the size (defined by the width and the height) of the loose core provided to the molded product under the estimation, and the number of loose cores to be used for each size. The texturing information input box g3 allows the operator to designate whether a texture is required (YES) or not required (NO). If the texture is required, the texture position is selected among from "body", "louver", and "insert". In addition, the dimensions (the length and the width) of the texture are also input from the input box g3. The engraving information input box g4 allows the operator to input the number of original plates, the number of spots on which the engraving of each of the symbols (for example, five symbols) is provided as a projection or an indentation on the molded product. The hot runner gate number input box g5 is a box for inputting the number of gate spots for each mold. The support/technique requirement input box g6 is a box for selecting presence or absence of the support requiring section and the technique requiring section.

When the product estimation list button h is selected in the main screen shown in FIG. 3, the screen is shifted to the molded product estimation output screen shown in FIGS. 45A and 45B, which will be described later. When the mold cost estimation list button i is selected in the main screen shown in FIG. 3, the screen is shifted to the mold cost output screen shown in FIG. 44, which will also be described later. When the CAD information confirmation button j is selected in the main screen of FIG. 3, the screen is shifted to the CAD information acquiring screen shown in FIG. 46, through which a prescribed CAD file is read. From the CAD file, the plan factors are analyzed to automatically acquire the parameters required to estimate the molded product and the mold itself. The details of the analysis are omitted in this specification.

Using the fabrication condition input screens illustrated in FIG. 3 through FIG. 7, all the necessary conditions required to estimate the mold and the molded product can be designated.

Returning to FIG. 2, upon acquiring the fabrication conditions through the above-described fabrication condition input screens, the data processing unit 44 reads the estimation reference values from the estimation reference value table stored in the storage 41, based on the designated fabrication conditions (step S2000).

The data processing unit 44 also reads the itemized mold estimation functions and the itemized molded product estimation functions from the storage 41 (step S3000).

Using the estimation reference values and the itemized mold estimation function, the data processing unit 44 calculates the estimated amount of each cost item of the mold individually, and stores the estimated amounts in the storage 41 (step S4000). In this embodiment, the cost items (or the breakdowns) of the mold include insert material cost, slide core material cost, loose core material cost, insert nitriding cost, insert hardening cost, slide core nitriding cost, loose core nitriding cost, texture processing cost, engraving cost, fixed part processing cost, variable part processing cost, slide core processing cost, loose core processing cost, design and programming cost, polishing cost, assembling/adjustment cost, trial cost, trial material cost, measurement cost, material management cost, general management cost, profit, and hot runner cost. The data processing unit 44 estimates the cost of each item separately. The itemized mold estimation functions required to estimate each cost item of the mold is described below.

Then, the data processing unit 44 sums up the costs of the respective items estimated and stored in the storage 41 to determine the total cost estimation of the mold used to fabricated the molded product (step S5000).

Next, the data processing unit 44 estimates each cost item of the molded product based on the estimation reference values and the itemized molded product estimation functions, and stores the estimated amounts of the items in the storage 41 (step 6000). In this embodiment, the items (or the breakdowns) of the molded product estimation include material cost, primary processing cost, secondary processing cost, material management cost, general management and sales cost, profit, treatment cost, transport and material handling cost, etc. The data processing unit 44 estimates each of these items. Each of the molded product estimation functions will be described below.

Then, the data processing unit 44 reads the estimated amounts of these items from the storage 41, and sums them up to determine the total cost estimation of the molded product under the estimation system (step S7000).

The data processing unit 44 outputs the total estimation of the mold, as well as the breakdown of the estimation of the mold, through the output unit 43 (step S8000). As has been described above, the total cost estimation of the mold is output together with the breakdown thereof in the mold cost output screen (see FIG. 44) when the mold cost estimation list button i is selected in the main screen shown in FIG. 3.

The data processing unit 44 also outputs the total cost estimation of the molded product, as well as the breakdown thereof, through the output unit 43 (step S9000). The total estimation of the molded product and the breakdown thereof is output in the molded product cost output screen (see FIG. 45) when the product estimation list button h is selected in the main screen shown in FIG. 3.

Then, the process terminates.

In the embodiment, estimation functions are prepared for each of the necessary cost items of the mold and the molded product, and stored in the storage 41. The costs of the mold and the molded product are promptly estimated using these estimation functions and the parameters read out from the estimation reference value tables. The itemized estimation functions and the estimation reference values, which are input as parameters into these functions, will be explained below.

[Estimation of Each Cost Item of Mold]

As has been described, itemized costs of the mold include costs for a mold base and purchased standardized articles, insert material cost, slide core material cost, loose core material cost, insert nitriding cost, insert hardening cost, slide core nitriding cost, loose core nitriding cost, texture processing cost, engraving cost, fixed part processing cost, variable part processing cost, slide core processing cost, loose core processing cost, design cost, programming cost, polishing cost, assembling/adjustment cost, trial cost, trial material cost, measurement cost, material management cost, general management cost, profit, and hot runner cost. The estimation functions are prepared corresponding to these items. In addition, an estimation reference value table is prepared for each of the estimation functions. The estimation reference value table defines the reference values, which are used as parameters to estimate the corresponding cost item using the estimation functions. The estimation formulas used to calculate the estimated amount of each cost item and the estimation reference value table are described in detail below.

FIG. 8 illustrates a mold base/purchased standardized article cost table used to estimate the cost relating to the mold base and the purchased standardized article. From this table, the price of the mold base and the price of the purchased standardized article are obtained. The table records the price (yen) of the purchased standardized article, the price (yen) of the mold base, and the total of these two, in association with the dimensions of the mold base and the mold plate type. Accordingly, the data processing unit 44 acquires the prices of the purchased standardized article and the mold base, on the basis of the number of plates (or the plate type) selected in the mold plate number input box c2 shown in FIG. 3, and on the dimensions of the molded product determined from the values of the length, the width, and the depth designated through the product size input box d1 shown in FIG. 4. The dimensions of the molded product corresponding to the product size designated through the molding size input box d1 can be obtained from the molded product size selection table shown in FIG. 9. The molded product size selection table records various sizes of products, in association with the length (mm), the width (mm), and the depth (mm) of the corresponding molded products. Accordingly, the data processing unit 44 can acquire the dimensions of the molded product that correspond to the length, the width, and the depth input through the product size input box d1, from the product size selection table stored in the storage 41.

Concerning estimation of the insert material cost, the data processing unit 44 calculates the estimated amount using formulas (2) through (8), which are estimation functions stored in the storage 41, and the predetermined estimation reference values defined in the estimation reference value table stored in the storage 41.

$$\text{Insert Material Cost} = 2*[(\text{Insert Material Weight})* \qquad (2)$$
$$900 + (\text{Material cutting Cost}]$$

where the insert material weight is calculated from formula (3), and the material cutting cost is calculated from formula (4) if the depth of the insert is 90 mm or less, and calculated from formula (5) if the depth of the insert exceeds 90 mm.

$$\text{Insert Material Weight} = L*W*D*7.86*E-6 \qquad (3)$$

$$\text{Material Cutting Cost} = L*W*0.065 \qquad (4)$$

$$\text{Material Cutting Cost} = L*W*0.065*1.2 \qquad (5)$$

where L denotes the length of the insert, W denotes the width of the insert, and D denotes the depth of the insert.

The parameter 7.86 (g/cm3) expressed in formula (3) is the specific gravity of pre-hardened steel, which similarly applies to formulas below.

Both the insert material weight and the material cutting cost are calculated based on the dimensions of the insert. Calculation of the dimensions of the insert differs depending on the number of molded products per shot. If the number of molded products per shot designated through the per-shot number input box c4 shown in FIG. 3 is one, the dimensions of the insert are obtained from formula set (6). If the number of molded products per shot is two, formula set (7) is used. If the number of molded products per shot is four or eight, formula set (8) is used.

$$L + 30 = \text{Length of Insert} \qquad (6)$$
$$W + 30 = \text{Width of Insert}$$
$$D + 30 = \text{Depth of Insert}$$

$$\text{Greater One of } L+30 \text{ or } W*2+70 = \text{Length of Insert} \qquad (7)$$
$$\text{Smaller One of } L+30 \text{ or } W*2+70 = \text{Width of Insert}$$
$$D*0.75 + 15 = \text{Depth of Insert}$$

$$L*2 + 70 = \text{Length of Insert} \qquad (8)$$
$$W*2 + 70 = \text{Width of Insert}$$
$$D*0.75 + 15 = \text{Depth of Insert}$$

where L denotes the length of the product, W denotes the width of the product, and D denotes the depth of the product.

Concerning estimation of the slide core material cost, the data processing unit 44 calculates the estimated amount of the slide core material using formula (9), which is an estimation function stored in the storage 41, and the predetermined estimation reference values defined in the associated estimation reference value table stored in the storage 41. The slide core material cost is estimated when "USED" is selected in the slide input box c8 shown in FIG. 3, and when a spot of the slide core with a certain size is set up in the pull-down menu of the slide core information input box g1 shown in FIG. 7.

$$\text{Size} - \text{Based Slide Core Material Cost} = \qquad (9)$$
$$[(\text{Unit Price of Slide Core Steel Material}) +$$
$$(\text{Unit Price of Purchased Standardized Article})]*$$
$$(\# \text{ of Slide Cores})*(\# \text{ of Molded products Per Shot})$$

The unit price of slide core steel material and the unit price of purchased standardized articles of slide core are parameters obtained from the associated estimation reference value table shown in FIG. 10. This table records the unit price (yen) of the steel material, the unit price (yen) of the purchased standardized article (yen), and the total amount (yen), in association with the slide core size (mm) and the corresponding slide core material size (mm). Accordingly, from this table, the data processing unit 44 acquires the unit prices of the slide core steel material and the purchased standardized article, corresponding to the slide core size selected through the slide core information input box g1 shown in FIG. 7. As to the number of molded products per shot and the number of slide cores used in formula (9), the data processing unit 44 uses those values designated in the per-shot number input box c4 and the slide core information input box g1.

Formula (9) is used to calculate the slide core material cost at "each size". The slide core information input box g1 shown in FIG. 7 allows the operator to input the number of slide cores at each size independently. Also, the unit prices of the slide core steel material and the purchased standardized article are recorded in the reference value table shown in FIG. 10 on a size basis. The data processing unit 44 first calculates the slide core material cost of a slide core of each size, and then, it sums up the calculated slide core material costs to determine the total amount of slide core material cost.

Concerning estimation of the loose core material cost, the data processing unit 44 calculates the estimated amount of the loose core material using formula (10), which is an estimation function stored in the storage 41, and the estimation reference values defined in the associated estimation reference value table stored in the storage 41. The loose core material cost is calculated when a slide core with a certain size is set up by the pull-down menu of the loose core information input box g2.

$$\begin{aligned}\text{Size}-\text{Based Loose Core Material Cost} = \\ [(\text{Unit Price of Loose Core Steel Material}) + \\ (\text{Unit Price of Purchased Standardized Article})] * \\ (\text{\# of Loose Cores}) * (\text{\# of Molded products Per Shot})\end{aligned} \quad (10)$$

The unit price of loose core steel material and the unit price of purchased standardized articles of loose core are parameters obtained from the associated estimation reference value table shown in FIG. 11. This table records the unit price (yen) of the loose core steel material, the unit price (yen) of the purchased standardized article (yen), and the total amount (yen), in association with the width (mm) and the depth (mm) of the loose core, together with width× thickness and the height (mm) of the loose core material. The loose core information input box g2 shown in FIG. 7 allows the operator to input the width and the depth of the loose core. Accordingly, a loose core material height table shown in FIG. 12 is prepared in the embodiment.

The loose core material height table records the loose core height (mm) and the loose core material height (mm) in association with the molded product size. The data processing unit 44 first acquires the height of the loose core material corresponding to the molded product size, from the loose core material height table stored in the storage 41. Then, the data processing unit 44 acquires the unit price of the loose core steel material and the unit price of the purchased standardized article of the loose core from the reference value table shown in FIG. 11, based on the width and the depth of the loose core selected through the loose core information input box g2 and the height of the loose core material specified by the loose core material height table shown in FIG. 12. The number of loose cores is specified by the value designated through the loose core information input box g2.

Formula (10) is used to calculate the loose core material cost at "each size". The loose core information input box g2 shown in FIG. 7 allows the operator to input the number of loose cores at each size independently. Also, the unit prices of the loose core steel material and the purchased standardized article are recorded in the reference value table shown in FIG. 11 on the size basis. The data processing unit 44 first calculates the loose core material cost of a loose core of each size, and then, it sums up the calculated loose core material costs to determine the total amount of loose core material cost.

Concerning estimation of the insert nitriding cost, the data processing unit 44 makes estimation using formulas (11) and (12), which are estimation functions stored in the storage 41, and the estimation reference values defined in the associated estimation reference value table stored in the storage 41. The insert for the mold is formed of pre-hardened steel. Depending on the resin material injected into the mold or the total number of shots, it becomes necessary to nitride the pre-hardened steel to reinforce its strength. The cost generated along with the nitriding process is the nitriding cost. Whether or not the nitriding process is required is determined from the mold material setting table shown in FIG. 13. This table defines the relation between the total number of shots and the necessity of the reinforcing process for the insert, the slide core, and the loose core, when using a glass-containing material, an engineering plastic material without containing glass, and a general-purpose material.

In order to determine the necessity of the reinforcing process, the data processing unit 44 first acquires the total number of shots by dividing the total number of lots input through the total lot number input box b2 by the number of molded products per shot designated through the per-shot number input box c4 of the main screen shown in FIG. 3. Then, the data processing unit 44 determines whether or not the estimation of insert nitriding cost is required, based on the total number of shots, the special material designation result input through the special material input box c5 to indicate whether the glass-containing material is used, and the material selected through the material code input box d3 of the main screen.

$$\text{Insert Nitriding Cost} = (\text{Material Weight}) \times (\text{Unit Price of Nitiding}) \quad (11)$$

The unit price of nitriding is determined in advance, for example, 700 yen/Kg.

$$\text{Material Weight} = L*W*D*7.86*E-6 \quad (12)$$

where L denotes the length of the insert, W denotes the width of the insert, and D denotes the depth of the insert.

Concerning estimation of the insert hardening cost, the data processing unit 44 makes estimation using formula (13) and the estimation reference values defined in the associated estimation reference value table stored in the storage 41. The insert hardening cost is generated when the pre-hardened steel is hardened. Whether or not the hardening process is required is determined from the mold material setting table shown in FIG. 13.

$$\text{Insert Hardening Cost} = (\text{Material Weight}) \times (\text{Unit Price of Hardening}) \quad (13)$$

The unit price of hardening used in formula (13), which is one of the estimation reference values, is acquired from the hardening unit price table (not shown), which records material weights in association with the unit prices for hardening. For example, if the material weight is less than 1 kg, the unit price is 750 yen/Kg. If the material weight is equal to or greater than 1 kg and smaller than 10 Kg, the unit price becomes 500 yen/Kg. If the material weight is equal to or greater than 10 Kg and smaller than 20 Kg, the unit price is 400 yen/Kg. With the material weight equal to or greater than 20 Kg, the unit price becomes 350 yen/Kg. The material weight used in formula (13) is calculated from formula (12).

Concerning estimation of the slide core nitriding cost, the data processing unit 44 makes estimation using formula (14) and the estimation reference values defined in the associated estimation reference value table stored in the storage 41. The slide core nitriding cost is generated when the nitriding process is required for the pre-hardened steel of the slide core. Whether or not the nitriding process is required is determined from the mold material setting table shown in FIG. 13.

$$\begin{aligned}\text{Slide Core Nitriding Cost (Each Size)} = \\ (\text{Unit Price of Slide Core Nitriding}) \times \\ (\text{\# of Slide Cores}) \times (\text{\# of Products/Shot})\end{aligned} \quad (14)$$

The unit price of slide core nitriding is acquired from the slide core nitriding cost table shown in FIG. 14. This table records the unit prices of the slide core nitriding process in association with the slide core size (mm) and the corresponding slide core material size (mm). The data processing unit 44 acquires the unit price of the nitriding process from this table, corresponding to the slide core size input through the slide core information input box g1. The number of slide cores used in formula (14) employs the number of slide cores for each size designated through the slide core information input box g1. The number of pieces per shot represents the value designated through the per-shot number input box c4. Similarly to the estimation of the slide core material cost, an individual slide core nitriding cost is first calculated for each size using formula (14), and then, the individual costs are summed up by the data processing unit 44 to obtain the total of the slide core nitiriding cost.

Concerning estimation of the loose core nitriding cost, the data processing unit 44 makes estimation using formula (15) and the estimation reference values defined in the associated estimation reference value table stored in the storage 41. The loose core nitriding cost is generated when the nitriding process is required for the pre-hardened steel of the loose core. Whether or not the nitriding process is required for the loose core is determined from the mold material setting table shown in FIG. 13.

$$\text{Loose Core Nitriding Cost (Each Size)} = \quad (15)$$
$$\text{(Unit Price of Loose Core Nitriding)} \times$$
$$\text{(\# of Loose Cores)} \times \text{(\# of Products/Shot)}$$

The unit price of loose core nitriding, which is one of the estimation reference values, is acquired from the loose core nitriding cost table shown in FIG. 15. This table records the unit prices of the loose core nitriding process in association with the width (mm) and the depth (mm) of the loose core, as well as with the thickness (mm) and the height (mm) of the loose core material. Similarly to estimation of the loose core material cost, the data processing unit 44 acquires the height of the loose core material from the loose core material height table shown in FIG. 12, corresponding to the molded product size. On the other hand, the data processing unit 44 uses the width and the depth of the loose core designated through the loose core information input box g2. Based on the loose core material height and the loose core width and depth, the corresponding unit price of loose core nitriding is specified. An individual loose core nitriding cost is first calculated for each size using formula (15), and then, the individual costs are summed up by the data processing unit 44 to obtain the total of the loose core nitiriding cost.

Concerning the texture processing cost, the data processing unit 44 makes estimation using formula (16) and the estimation reference values defined in the associated estimation reference value table stored in the storage 41. The texture processing cost is estimated when the texture is designated through the texturing information input box g3 of the mold information input screen shown in FIG. 7.

$$\text{Texture Processing Cost} = \quad (16)$$
$$\sum [(L+W)*100*(\text{Texture Coef})*$$
$$(\text{Masking Coef})] \times (\text{\# of Products Per Shot})$$

where L denotes the length of the texture, and W denotes the width of the texture.

The masking coefficient used in formula (16) is acquired from the masking coefficient table (not shown), which records the masking coefficients as estimation reference values, in association with the masking spots (on the main body, the louver, and the insert). For example, the masking coefficient for the main body is set to 1.2. The masking coefficients for the louver and the insert are 1.5 and 1.0, respectively. The data processing unit 44 refers to the pull-down menu of the texturing information input box g3 to check the designated spot, and acquires the corresponding masking coefficient from the masking coefficient table. The value "100" represents the texture processing cost per unit length (yen/mm). The texture coefficient used in formula (16) is set to 1.4 in advance. The length and the width of the texture employ the values of those designated in the texturing information input box g3.

Concerning the engraving cost, the data processing unit 44 makes estimation using formula (17) and the estimation reference values defined in the associated estimation reference value table stored in the storage 41. The engraving cost is estimated when the texture is designated through the engraving information input box g4 of the mold information input screen shown in FIG. 7.

$$\text{Engraving Cost} = \quad (17)$$
$$\sum [(\text{Symbol Unit Price})*N*(\text{Pieces Per Shot})] +$$
$$(\text{Unit Price of Negative})*(\text{\# of Negatives}) +$$
$$(\text{Transport Cost})$$

where N denotes the number of engraved symbols.

The unit price of a symbol differs depending on the type of symbol and on whether the symbol is projected or indented. The unit price of the symbol engraved on the mold is acquired from the symbol unit price table shown in FIG. 16, which records multiple types of symbols in association with the unit price (yen per symbol). The data processing unit 44 acquires the unit price of each symbol designated through the engraving information input box g4 based on the symbol unit price table. The unit price of the negative plate used in formula (17) is set to 7500 yen, and the transportation cost is set to 12000 yen.

Concerning the fixed part processing cost, the data processing unit 44 makes estimation using formula (18) and the estimation reference values defined in the associated estimation reference value table stored in the storage 41. The fixed part processing cost is a cost required to process plate parts other than those taking part in the shape of the molded product.

$$\text{Fixed Part Processing Cost} = \quad (18)$$
$$(\text{Equipment Change} - \text{over Time})*(\text{Time Coef})*$$
$$[(Eq \ \& \ WPC_E \ \text{Cost Rate}) + (\text{Lab} \ \& \ WPC_L \ \text{Cost Rate})] +$$
$$(\text{Equipment Processing Time})*(\text{Time Coef.})*$$
$$[(Eq \ \& \ WPC_E \ \text{Cost Rate}) + (\text{Lab} \ \& \ WPC_L \ \text{Cost Rate})]/N$$

where Eq&WPC$_E$ cost rate denotes the cost rate (yen/hour) of equipment and work place common expense proportional to the equipment, Lab/WPC$_L$ cost rate denotes the cost rate (yen/hour) of labor and work place common expense proportional to the labor, and N denotes the number of that type of equipment.

Formula (18) is used to estimate the processing cost generated at each type of equipment. For example, the fixed part of the mold is successively subjected to the processes at the machining center (referred to as "MC"), the radial drill (referred to as "RB"), the milling machine, the plane grinder, the hand tap, etc. The cost at the individual process is estimated separately, and then, the calculated costs are summed up to estimate the total processing cost of the fixed part.

The equipment change-over time and the equipment processing time, which are the parameters used as estimation reference values in formula (18), are acquired from a fixed part processing net time determination table shown in FIG. 17. The fixed part processing net time determination table records the processing time at each type of equipment in association with the size of the molded product. Since the processing time varies depending on whether the mold is a two-plate type or three-plate type, two types of tables are prepared for these two mold types. The data processing unit 44 refers to the mold plate number input box c2 of the main menu to determine the value (2 or 3), and reads the appropriate type of processing net time determination table.

The time coefficient and the number of types of equipment used in formula (18) are acquired from the cost center (referred to as "C/C") time coefficient table shown in FIG. 18. Cost center (C/C) represents the equipment used to process the mold. The time coefficient table records various types of C/Cs, each in association with the time coefficient and the number of types of equipment.

The cost rate of equipment and $WPC_E$ (work place common cost proportional to equipment) and the cost rate of labor and $WPC_L$ (work place common cost proportional to labor) are acquired from the mold-processing C/C cost rate sum-up table shown in FIG. 19, which records these cost rates at each type of equipment. Although the table stores both the cost rate per hour (yen/hour) and the cost rate per second (yen/sec) for the equipment and $WPC_E$ cost rate and the labor and $WPC_L$ cost rate, the cost rate per hour is used in this embodiment to estimate the mold fabrication cost. The same applies to the molding primary process C/C cost rate sum-up table shown in FIG. 28 and the molding secondary process C/C cost rate sum-up table shown in FIG. 41, which are used to estimate the cost of a molded product produced using the mold and will be described later.

The mold-processing C/C cost rate sum-up table of FIG. 19 has a column of C/C capacity. The machining center has small, medium, and large capacities, while the wire cut electric spark machine has small and large capacities. The NC miller has small and medium capacities, the milling machine has small and large capacities, and the plane grinder has small and large capacities. The equipment and $WPC_E$ cost rate and the labor and $WPC_L$ cost rate vary depending on the size (or the capacity) of the equipment. The size of the equipment used to process the mold is determined from the molded product size, the relation of which is defined in the equipment capacity selection table shown in FIG. 20. The equipment capacity selection table records the molded product size (mm) and the insert size (mm) in association with the suitable capacity of the equipment. Accordingly, the data processing unit 44 can select the capacity of the equipment using the table based on either the designated size of the molded product or the calculated size of the insert.

Concerning the variable part processing cost, the data processing unit 44 makes estimation using formulas (19) and (1'), which are estimation functions stored in the storage 41, and the estimation reference values defined in the associated estimation reference value table stored in the storage 41. The variable part processing cost is a cost required to process plate parts that take part in the shape of the molded product.

Variable Part Processing Cost = (19)
(Variable Part Processing Time) *
(Fixed Part Average Cost Rate)

Variable Part Processing Time = (1')
(Estimation Coef) * [(Volume of Product) *
(# of Products/Shot)]$^{1/2}$ * (Product Coef) *
[1 + (Geometric Tolerance Coef) +
(Size Grade Coef)] * [1 + (Hardening Coef)]

The fixed part average cost rate (yen/hour) used in formula (19) is obtained by dividing the fixed part processing cost (yen) by the fixed part processing time (hour).

The geometric tolerance coefficient used as an estimation reference value in formula (1') is acquired from the geometric tolerance coefficient table shown in FIG. 21A, which records the geometric tolerance, designated ranges in association with the corresponding coefficients. The data processing unit 44 refers to the table to acquire the geometric tolerance coefficient from the range of the geometric tolerance designated through the geometric tolerance designation box c12 in the main menu.

The size grade coefficient is acquired from the size grade coefficient table shown in FIG. 21B. This table records the size grades and the associated coefficients. The data processing unit 44 acquires the coefficient from the table based on the size grade designated through the size grade input box c9.

The hardening coefficient used in formula (1') is acquired from the hardening coefficient table 21C. This table records coefficients depending on whether or not the hardening process is required. The data processing unit 44 refers to the mold material determination table shown in FIG. 13 to determine the necessity of the hardening process, and acquires the appropriate coefficient from the hardening coefficient table of FIG. 21C.

The product coefficient used as an estimation reference value in formula (1') is acquired from the product coefficient table shown in FIG. 22, which records various types of products in association with coefficients. The data processing unit 44 acquires the coefficient from the product coefficient table based on the product type input through the product type input box a1 of the main menu.

The estimation coefficient in formula (1') is determined from the past estimation record, and it is set to, for example, 0.7 as the current value. The volume of the product is obtained from the product volume input box d2 of the material information screen shown in FIG. 4. The number of molded products taken per shot is obtained from the per-shot number input box c4 of the main menu.

Figure 23:
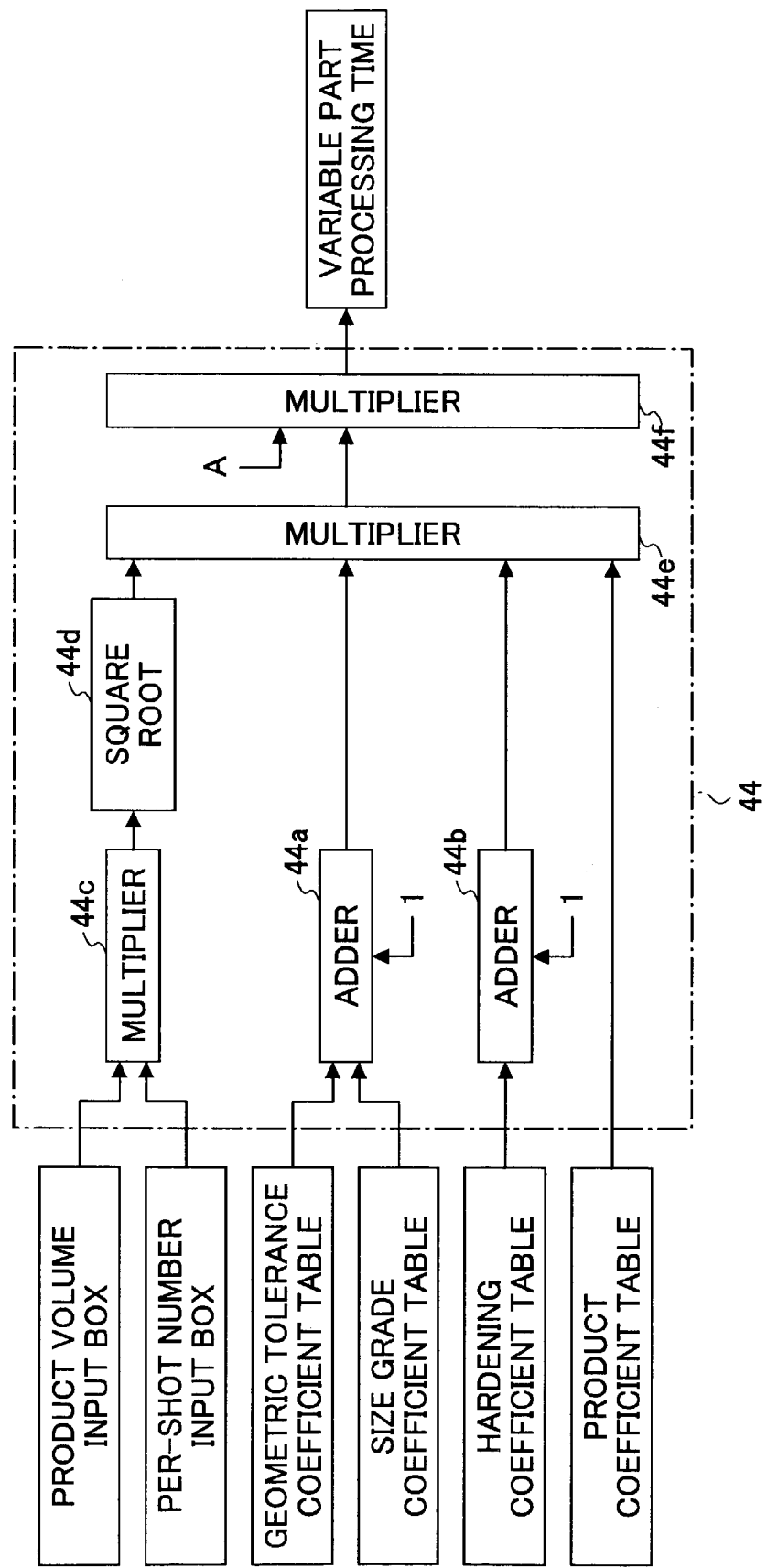
FIG. 23 is a functional block diagram of the processing unit 44.

FIG. 23 illustrates computation of formula (1'), which is one of the features of the present invention. The data processing unit 44 has a first adder 44a and a second adder 44b. The first adder 44a adds 1 to the sum of the size grade coefficient and the geometric tolerance coefficient obtained from the size grade coefficient table and the geometric tolerance coefficient table, respectively. The second adder 44b adds 1 to the hardening coefficient obtained from the hardening coefficient table. The data processing unit 44 further includes a first multiplier 44c and a square root extraction unit 44d to calculate the square root of the product of the volume of the molded product designated through the product volume input box d2 and the number of molded products taken per shot designated through the per-shot number input box c4. The second multiplier 44e of the data processing unit 44 multiplies the outputs of the adders 44a and 44b and the square root supplied from the square root extraction unit 44d. Then, the third multiplier 44f multiplies the multiplication result of the second multiplier 44e by the estimation coefficient A, which is set to 0.7 in this example. The output of the third multiplier 44f is the variable part processing time used to estimate the variable part processing cost.

In general, various factors are related to estimation of the variable part processing cost of a mold, and it is deemed to be inefficient to incorporate all of these factors into the estimation function to estimate the variable part processing cost. However, the inventors of the present invention empirically found that with formula (1') the estimation error of the variable part processing cost can be kept within a predetermined acceptable range. Therefore, the variable part processing cost of the mold is estimated using formula (1') in this embodiment.

Concerning the slide core processing cost, the data processing unit 44 makes estimation using formula (20), which is an estimation function stored in the storage 41, and the estimation reference values defined in the associated estimation reference value table stored in the storage 41. The slide core processing cost is estimated when any size of slide core is designated in the pull-down menu of the slide core information input box g1 shown in FIG. 7.

$$\text{Slide Core Processing Cost (Each Size)} = \quad (20)$$
$$\{(\text{Equipment Change-over Time}) * (\text{Time Coef.}) * [$$
$$(Eq \ \& \ WPC_E \ \text{Cost Rate}) + (\text{Lab} \ \& \ WPC_L \ \text{Cost Rate})] +$$
$$(\text{Equipment Processing time}) * (\text{Time Coef.}) * [$$
$$(Eq \ \& \ WPC_E \ \text{Cost Rate}) + (\text{Lab} \ \& \ WPC_L \ \text{Cost Rate})] *$$
$$(\# \ \text{of Products/shot}) / N \} * (\# \ \text{of slide Cores})$$

where Eq & $WPC_E$ cost rate denotes the cost rate (yen/hour) of equipment and work place common expense proportional to the equipment, Lab & $WPC_L$ cost rate denotes the cost rate (yen/hour) of labor and work place common expense proportional to the labor, and N denotes the number of that type of equipment.

Since the slide core process includes various processes carried out at MC (machining center), plane grinder, molding grinder, RB, and hand tap, Formula (20) is used to estimate the processing cost for each type of equipment. The cost for each individual type of equipment is estimated separately, and then, the estimated costs for the respective types of equipment are summed up to estimate the total processing cost of the slide core.

The equipment change-over time and the equipment processing time are acquired from a slide size-based processing time determination table shown in FIG. 24. As in estimation using formula (18), the time coefficient and the number of types of equipment are acquired from the C/C time coefficient table shown in FIG. 18. The equipment and $WPC_E$ cost rate and the labor and $WPC_L$ cost rate are acquired from the mold processing C/C cost rate sum-up table shown in FIG. 19. Similarly to the estimation of slide core material cost, the slide core processing cost is estimated at each size, and then, the costs estimated on the size basis are summed up to estimate the total processing cost of the slide core.

Concerning the loose core processing cost, the data processing unit 44 makes estimation using formula (21), which is an estimation function stored in the storage 41, and the estimation reference values defined in the associated estimation reference value table stored in the storage 41. The loose core processing cost is estimated when any size of loose core is designated in the pull-down menu of the loose core information input box g2 shown in FIG. 7.

$$\text{Loose Core Processing Cost (Each Size)} = \quad (21)$$
$$\{(\text{Equipment Change-over Time}) * (\text{Time Coef.}) * [$$
$$(Eq \ \& \ WPC_E \ \text{Cost Rate}) + (\text{Lab} \ \& \ WPC_L \ \text{Cost Rate})] +$$
$$(\text{Equipment Processing time}) * (\text{Time Coef.}) * [$$
$$(Eq \ \& \ WPC_E \ \text{Cost Rate}) + (\text{Lab} \ \& \ WPC_L \ \text{Cost Rate})] *$$
$$(\# \ \text{of Products/Shot}) / N \} * (\# \ \text{of Loose Cores})$$

where N denotes the number of equipments.

Since the loose core process includes various processes carried out at MC, the milling machine, plane grinding, the molding grinder, WC, etc, the cost generated at the individual type of equipment is estimated separately, and then, the calculated costs are summed up to estimate the total processing cost of the loose core.

The equipment change-over time and the equipment processing time are acquired from a slide size-based loose core processing time determination table shown in FIG. 25. As in estimation using formula (18), the time coefficient and the number of types of equipment are acquired from the C/C time coefficient table shown in FIG. 18. The equipment and $WPC_E$ cost rate and the labor and $WPC_L$ cost rate are acquired from the mold processing C/C cost rate sum-up table shown in FIG. 19. Similarly to the estimation of loose core material cost, the loose core processing cost is estimated at each size, and then, the costs estimated on the size basis are summed up to estimate the total processing cost of the loose core.

Concerning the design and programming cost, the data processing unit 44 makes estimation using formula (22), which is an estimation function stored in the storage 41, and the estimation reference values defined in the associated estimation reference value table stored in the storage 41.

$$\text{Design \& Programming Cost} = (\text{Design \& Programming Time}) * [ \quad (22)$$
$$(CAD/CAM/CAE \ Eq \ \& \ WPC_E \ \text{Cost Rate}) +$$
$$(CAD/CAM/CAE \ \text{Lab} \ \& \ WPC_L \ \text{Cost Rate})]$$

Among the parameters (i.e., the estimation reference values), the CAD/CAM/CAE equipment and $WPC_E$ cost rate and the CAD/CAM/CAE labor and $WPC_L$ cost rate are acquired from the mold processing C/C cost rate sum-up table shown in FIG. 19. The design and programming time is calculated from formula (23).

$$\text{Design \& Programming Time} = 0.20 * [ \qquad (23)$$
$$\text{(fixed part processing time)} + \text{(variable part processing time)}] +$$
$$\sum [\text{(slide core processing time)} +$$
$$\text{(loose core processing time)}] + \text{(Change - over time)}$$

The value 0.20 is a predetermined coefficient for the estimation of design and programming cost. The change-over time is set to 2 hours. In order to calculate the design and programming time, the fixed part processing time, the variable part processing time, the slide core processing time, and the loose core processing time have to be specified. As has been described above, the fixed part processing includes the processes at MC, RB, milling machine (MM), plane grinder (PG), and hand tap (HT). The slide core processing includes the processes at MC, plane grinder (PG), molding grinder (NG), RB, and hand tap (HT). The loose core processing includes the processes at MC, milling machine (MM), plane grinder (PG), molding grinder (MG), and WC. Accordingly, the fixed part processing time, the slide core processing time, and the loose core processing time are calculated from formulas (24), (25) and (26), respectively. The variable part processing time is calculated using formula (1'), as is explained above.

$$\text{Fixed Part Processing Time} = \qquad (24)$$
$$MC\{Tchg * (\text{Time Coef}) + Tproc * (\text{Time Coef})\} +$$
$$RB\{\{Tchg * (\text{Time Coef.}) + Tproc * (\text{Time Coef.})\} +$$
$$MM\{\{Tchg * (\text{Time Coef}) + Tproc * (\text{Time Coef})\} +$$
$$PG\{\{Tchg * (\text{Time Coef.}) + Tproc * (\text{Time Coef.})\} +$$
$$HT\{\{Tchg * (\text{Time Coef.}) + Tproc * (\text{Time Coef.})\}$$

$$\text{Slide Core Processing Time(Each Size)} = [ \qquad (25)$$
$$MC\{Tchg * (\text{Time Coef})\} + PG\{Tchg * (\text{Time Coef})\} +$$
$$MG\{Tchg * (\text{Time Coef})\} + RB\{Tchg * (\text{Time Coef})\} +$$
$$HT\{\{Tchg * (\text{Time Coef})\} + [MC\{Tproc * (\text{Time Coef})\} +$$
$$PG\{Tproc * (\text{Time Coef})\} + MG\{Tproc * (\text{Time Coef})\} +$$
$$RB\{Tproc * (\text{Time Coef})\} + HT\{\{Tproc * (\text{Time Coef}]\} *$$
$$(\text{\# of Products/Shot}) * (\text{\# of Slide Cores})$$

$$\text{Loose Core Processing Time(Each Size)} = [ \qquad (26)$$
$$MC\{Tchg * (\text{Time Coef})\} +$$
$$PG\{Tchg * (\text{Time Coef})\} + MG\{Tchg * (\text{Time Coef})\} +$$
$$WC\{Tchg * (\text{Time Coef})\} + MM\{\{Tchg * (\text{Time Coef})\} + [$$
$$MC\{Tproc * (\text{Time Coef})\} + PG\{Tproc * (\text{Time Coef})\} +$$
$$MG\{Tproc * (\text{Time Coef})\} + WC$$
$$\{Tproc * (\text{Time Coef})\} + MM\{\{Tproc * (\text{Time Coef})\}]$$
$$* (\text{\# of Products/Shot}) * (\text{\# of Loose Cores})$$

where Tchg denotes the equipment change-over time, and Tproc denotes the equipment processing time.

Concerning the polishing cost, the data processing unit 44 makes estimation using formulas (27) and (28), which are estimation functions stored in the storage 41, and the estimation reference values defined in the associated estimation reference value table stored in the storage 41.

$$\text{Polishing Cost} = (\text{Polishing Time}) * \qquad (27)$$
$$\text{Polish}[(Eq \ \& \ WPC_E \ \text{Cost Rate}) + (\text{Lab} \ \& \ WPC_L \ \text{Cost Rate})]$$

-continued
$$\text{Polishing Time} = \qquad (28)$$
$$(\text{Basic Time}) + [(\text{Product Volume}) * (\text{\# of Products Per Shot})]^{1/2} *$$
$$0.1 * (\text{Polishing Coef})$$

The polishing coefficient that is an estimation reference value used in formula (28) is acquired from the polishing coefficient table shown in FIG. 21D. This table records the external appearances of the molded product in association with the polishing coefficients. The data processing unit 44 acquires the appropriate polishing coefficient from this table based on the external appearance grade designated through the appearance grade input box c6 of the main menu. The basic time used in formula (28) is set to 2 hours in advance. The volume of the molded product is one input through the product volume input box d2 of the material information input screen shown in FIG. 4. The parameter 0.1 in formula (28) is obtained from the past record of the polishing process.

Concerning the assembling and adjustment cost, the data processing unit 44 makes estimation using one of formulas (29) and (30), which are estimation functions stored in the storage 41, and the estimation reference values defined in the associated estimation reference value table stored in the storage 41. Either formula (29) or (30) is used depending on the capacity of the molding machine for producing a molded product using the mold. There are fifteen capacity levels, for example, 18 tons, 30 tons, 55 tons, 80 tons, 100 tons, 170 tons, 220 tons, 280 tons, 350 tons, 450 tons, 550 tons, 650 tons, 850 tons, 1300 tons, and 1600 tons. If the capacity of the molding machine is between 18 tons and 220 tons, formula (29) is used. If the capacity of the molding machines resides between 280 tons and 1600 tons, formula (30) is used.

The data processing unit 44 specifies the capacity of the molding machine from the molding machine capacity selection table shown in FIG. 26. In this table, capacities of the molding machines are recorded in association with the projected area and the dimensions of the molded product. The data processing unit 44 picks up one or more capacities corresponding to the product type input through the product type input box a1, the projected area designated in the projected area input box d7, and the length, the width, and the depth designated in the product size input box d1. Among the capacities picked up from the table, the greatest capacity is selected to specify the molding machine to be used.

For example, if the product type designated in box a1 is "others", with "3" plate-type selected in box c2, and if the dimensions of the molded product designated in box d1 are length of "1620", width of "850", and depth "355", with the projected area of "157000", then several capacities are picked up form the table. Namely, capacity of 550 tons corresponds to the product type "others" and the projected area "157000", capacity of 1300 tons corresponds to the length "1620" and the width "850", and capacity of 850 tons corresponds to the depth "355" of the three-plate-type mold. Under this situation, the data processing unit 44 selects the capacity of 1300 tons for the molding machine.

$$\text{Assembling and Adjustment Cost} = \qquad (29)$$
$$(\text{Assembling and Adjustment Time}) * [$$
$$(\text{Assmbl(Hand)} Eq \ \& \ WPC_E \text{ Cost Rate}) +$$
$$(\text{Assmbl(Hand)Lab} \ \& \ WPC_L \text{ Cost Rate})]$$

$$\text{Assembling and Adjustment Cost} = \qquad (30)$$
$$(\text{Assembling and Adjustment Time}) * [$$
$$0.1 * (\text{Assmbl}(DS \ \& \ Inv)Eq \ \& \ WPC_E \text{ Cost Rate}) +$$
$$0.9 * (\text{Assmbl}(DS \ \& \ Inv)\text{Lab} \ \& \ WPC_L \text{ Cost Rate})]$$

where DS & Inv denotes die spot and inversion.

Among the parameters (i.e., the estimation reference values), assembling(Hand) equipment and WPCE cost rate, assembling(Hand) labor and $WPC_L$ cost rate, assembling (DS & Inv) equipment and $WPC_E$ cost rate, and assembling (DS & Inv) labor and $WPC_L$ cost rate are acquired from the mold processing C/C cost rate sum-up table shown in FIG. 19. The assembling and adjustment time used in these formulas are calculated from formula (31).

$$\text{Assembling and Adjustment Time} = \qquad (31)$$
$$(\text{Capacity} - \text{based Basic Time}) * [$$
$$1 + (0.1 * Ns + 0.02 * Nl) * (\text{\# of Products Per Shot})]$$
$$* [1 + (\text{Geometric Tolerance Coef}) + (\text{Size Grade Coef})]$$

where Ns denotes the total number of slide cores, and N1 denotes the total number of loose cores.

Among the parameters, the capacity-based basic time is obtained from assembling and adjustment basic time determination table shown in FIG. 27A, which records a basic time in association with the each of the ton ranges specified by the molding machine capacity selection table shown in FIG. 26. The geometric tolerance coefficient and the size grade coefficient are acquired from the geometric tolerance coefficient table and the size grade coefficient table shown in FIGS. 27B and 27C, respectively. The total number of slide cores (Ns) is the total spots of slide cores of selected sizes designated in slide core information input box g1. The total number of loose cores (N1) is the total spots of loose cores of selected sizes designated in the loose core information input box g2.

Concerning the trial cost, the data processing unit 44 makes estimation using formula (32), which is an estimation function stored in the storage 41, and the estimation reference values defined in the associated estimation reference value table stored in the storage 41.

$$\text{Trial Cost} = \qquad (32)$$
$$(\text{Trial Time}) * [(\text{Molding Machine } Eq \ \& \ WPC_E \text{ Cost Rate}) +$$
$$(\text{Molding Machine Lab} \ \& \ WPC_L \text{ Cost Rate})]$$

The trial time means total of time required for machines to conduct trial work (machine trial time) and time required for workers to conduct trial work (trial process). The molding machine equipment and $WPC_E$ cost rate and the molding machine labor and $WPC_L$ cost rate are acquired from a molding primary processing C/C cost rate sum-up table shown in FIG. 28. This table defines capacities of molding machines according to the acceptable material weight and types of molding machines used for glass-containing molding, hot runner molding, and glass-containing hot runner molding, in association with equipment & $WPC_E$ cost rate and labor & $WPC_L$ cost rate of the primary processing of the corresponding molding machines.

The trial time in formula (32) is calculated using formula (33).

$$\text{Trial Time} = (\text{Unit Time of trial}) * (\text{\# of Trials}) \qquad (33)$$

The unit time of trial used in formula (33) is the sum of the unit time of trial work and the unit process of the trial work specified in table shown in FIG. 29A. The table of FIG. 29A defines the trial unit time and trial unit process for each capacity range of the molding machine. The capacity of the molding machine can be specified from the molding machine capacity selection table shown in FIG. 26, as has been described in connection with estimation of the assembling and adjustment cost.

The number of trials is acquired from trial count table shown in FIG. 29B. This table defines molding conditions, such as implementation of a texturing process, and technical test or technical support designated through the input boxes g3 and g6, respectively, of the molding information input screen of FIG. 7, in association with the corresponding trial counts.

Concerning the trial material cost, the data processing unit 44 makes estimation using formula (34), which is an estimation function stored in the storage 41, and the estimation reference values defined in the associated estimation reference value table stored in the storage 41.

$$\text{Trial Material Cost} = (\text{Weight of Trial Material}) * (\text{Material Unit Price}) \qquad (34)$$

The unit price of the material is acquired from the prescribed material database. The weight of the trial material is calculated from formula (35).

$$\text{Weight of Trial Material} = [ \qquad (35)$$
$$(\text{Product Weight}) + (\text{Spool Runner Weight})] *$$
$$(\text{\# of Products Per Shot}) * 100$$

The value 100 is selected because in general a hundred shots are taken during the trial work. The product weight and the spool weight can be obtained from the product weight input box d3 and the spool runner weight input box d4 of the material information input screen shown in FIG. 4. The number of molded products per shot is obtained from the per-shot number input box c4.

Concerning the measurement cost, the data processing unit 44 makes estimation using formula (36), which is an estimation function stored in the storage 41, and the estimation reference values defined in the associated estimation reference value table stored in the storage 41.

$$\text{Measurement Cost} = (\text{Measurement Time}) * [\text{Measurement}(Eq \ \& \ WPC_E \text{ Cost Rate} + \text{Lab} \ \& \ WPC_L \text{ Cost Rate})] \qquad (36)$$

The equipment and $WPC_E$ cost rate and the labor and $WPC_L$ cost rate are acquired from mold processing C/C cost rate sum-up table shown in FIG. 19. The measurement time used in formula (36) varies depending on the capacity of the molding machine, and is calculated from formula (37).

$$\text{Measurement Time} = [(\text{Change-over Time}) + (\text{Measurement}) * (1 + (\text{Geometric Tolerance Coef}) + (\text{Size Grade Coef})) * C_N] * C_S \quad (37)$$

where $C_N$ denotes the per-shot number coefficient, and $C_S$ denotes the support requiring coefficient.

The change-over time and the measurement time for each capacity range are acquired from the capacity-based change-over time determination table and measurement time determination table shown in FIG. 30A and FIG. 30B, respectively. The geometric tolerance coefficient and the size grade coefficient are acquired from the geometric tolerance coefficient table and the size grade coefficient table shown in FIG. 30C and FIG. 30D, respectively. The per-shot number coefficient and support requiring coefficient are acquired from a per-shot number coefficient table and a support requiring coefficient table shown in FIGS. 30E and 30F, respectively.

Concerning the material management cost, the data processing unit 44 makes estimation using formula (38), which is an estimation function stored in the storage 41, and the estimation reference values defined in the associated estimation reference value table stored in the storage 41.

$$\text{Material Management Cost} = (\text{Material Management Rate}) * [(\text{Mold Base Cost}) + (\text{Purchased Standardized Article Cost}) + (\text{Insert Material Cost}) + (\text{Slide Core Material Cost}) + (\text{Loose Core Material Cost}) + (\text{Nitriding and Hardening Cost for Insert, Slide Core and Loose Core}) + (\text{Texture Processing Cost}) + (\text{Engraving Cost}) + (\text{Trial Cost})]. \quad (38)$$

In this example, the material management rate is set to 6.3%.

Concerning the general management cost, the data processing unit 44 makes estimation using formula (39), which is an estimation function stored in the storage 41, and the estimation reference values defined in the associated estimation reference value table stored in the storage 41.

$$\text{General Management and Sales Cost} = (\text{General Management and Sales Rate}) * [(\text{Design/Programming Cost}) + (\text{Fixed Part Processing Cost}) + (\text{Variable Part Processing Cost}) + (\text{Slide Core Processing Cost}) + (\text{Loose Core Processing Cost}) + (\text{Polishing Cost}) + (\text{Assembling and Adjustment Cost}) + (\text{Trial Cost}) + (\text{Measurement Cost})] \quad (39)$$

In this example, the general management and sales rate is set to 11.2%.

Concerning the Profit, the data processing unit 44 makes estimation using formula (40), which is an estimation function stored in the storage 41, and the estimation reference values defined in the associated estimation reference value table stored in the storage 41.

$$\text{Profit} = (\text{Profit Rate}) * [(\text{Design/Programming Cost}) + (\text{Fixed Part Processing Cost}) + (\text{Variable Part Processing Cost}) + (\text{Slide Core Processing Cost}) + \quad (40)$$

(Loose Core Processing Cost) + (Polishing Cost) +

(Assembling and Adjustment Cost) + (Trial Cost) +

(Measurement Cost) + (Material Management Cost) +

(General Management and Sales Cost)]

In this example, the profit rate is set to 5%.

When "hot runner" is selected in the runner type input box c11 of the main screen, hot runner adding cost has to be calculated in the estimation of the mold. The hot runner adding cost is the total amount of hot runner system purchase cost, GF material chip heater cost, insert hardening cost (near-gate hardening cost), spacer block cost, hot runner processing cost, hot runner integration/wiring cost, material management cost, general management cost, and profit. Accordingly, each cost item is estimated individually, and then, the total amount is calculated by summing up all the items to determine the hot runner adding cost for the mold. The breakdown of the hot runner adding cost will be described below.

The hot runner system purchase cost is acquired from the hot runner system price table shown in FIG. 31. This table describes the capacity (tons) of the molding machine using the mold and the number of valve gates added to the mold, in association with the hot runner system price. The number of valve gates is designated through the hot runner gate input box g5 of the mold information screen shown in FIG. 7.

Concerning the GF material chip heater cost, the data processing unit 44 makes estimation using formula (41), which is an estimation function stored in the storage 41.

GF Material Chip Heater Cost=(Chip Heater Cost)
*(# of gate spots)  (41)

The chip heater cost is set to 50000 yen. The number of gate spots used in formula (41) is obtained from the value of the hot runner gate input box g5.

Concerning the insert hardening cost, the data processing unit 44 makes estimation using formula (42), which is an estimation function stored in the storage 41, and the estimation reference values defined in the associated estimation reference value table stored in the storage 41.

Insert Hardening Cost = [(Unit price of Insert Material) + (Unit Cost of Hardening Process)] * 2 * (# of gates)  (42)

The unit price of insert material and the unit cost of the hardening process, which are the parameters (i.e., the estimation reference values) used in formula (42), are acquired from the insert hardening cost table shown in FIG. 32. This table records molded product size, corresponding gate diameter (mm) the unit price of insert material (yen/piece), unit cost of hardening (yen/piece), the sum of the insert material unit price and the unit cost of hardening (yen/piece), and the cost per gate spot (yen/spot). The value "2" set in formula (42) is introduced because an insert is added to each the cavity and the core of the mold.

The hot runner spacer block cost is acquired from the spacer block material cost table for hot runner shown in FIG. 33. This table records molded product size (mm), corresponding spacer block mold size (mm), left/right spacer block size (mm), left/right spacer block cost (yen), top/bottom spacer block size (mm), top/bottom spacer block cost (yen), and the total cost (yen) for size of spacer block. The data processing unit 44 refers to the molded product size selection table shown in FIG. 9, and then acquires the hot runner spacer block cost from the spacer block cost table shown in FIG. 33.

Concerning the hot runner processing cost, the data processing unit 44 makes estimation using formula (43), which is an estimation function stored in the storage 41, and the estimation reference values defined in the associated estimation reference value table stored in the storage 41.

Equipment-Based Hot Runner Processing Cost =  (43)
$\Sigma Eq[Tchg * C_{T1} * (Eq$ & $WPC_E$ Cost Rate + Lab & $WPC_L$
Cost Rate) + (# of Gates) * $Tproc * C_{T2} * (Eq$ & $WPC_E$ Cost
Rate + Lab & $WPC_L$ Cost Rate)/(# of types of equipment)]

where Tchg denotes change-over time, and Tproc denotes processing time, $C_{T1}$*denotes the time coefficient of change-over time, and $C_{T2}$*denotes the time coefficient of processing time.

Since the hot runner processing process includes various processes carried out at MC (machining center), electric spark machine, RB, and hand tap, the cost generated at the individual type of equipment is estimated separately, and then, the costs calculated for the respective types of equipment are summed up to estimate the total amount of the hot runner processing cost. The time coefficients $C_{T1}$, $C_{T2}$ and the number of types of equipment are acquired from the C/C time value coefficient setting table shown in FIG. 18. The equipment and $WPC_E$ cost rate and the Labor and $WPC_L$ cost rate are obtained from the molding primary processing C/C cost rate sum-up table shown in FIG. 28. The change-over time and the processing time are acquired from the hot runner net time determination table shown in FIG. 34. This table records molded product size (mm) and corresponding change-over time (hour) and processing time (hour) at each type of equipment of MC, electric spark machine, RB, and hand tap.

Concerning the hot runner integration and wiring cost, the data processing unit 44 makes estimation using formula (44), which is an estimation function stored in the storage 41, and the estimation reference values defined in the associated estimation reference value table stored in the storage 41.

$$\text{Hot Runner Integration/Wiring Cost} = [(\text{Integration Time}) + (\text{Wiring Time})] \times [Assmbl(Eq \& WPC_E \text{ Cost Rate} + Lab \& WPC_L \text{ Cost Rate})] \quad (44)$$

The integration time and the wiring time, which are the estimation reference values used in formula (44), are acquired from the hot runner integration/wiring time determination table shown in FIG. 35. The hot runner integration/wiring time determination table records integration time, wiring time, and the total time, in association with the number of hot runner gate spots. The equipment and $WPC_E$ cost rate and the labor and $WPC_L$ cost rate are acquired from the mold processing C/C cost rate sum-up table shown in FIG. 19.

Concerning the hot runner material management cost, the data processing unit 44 makes estimation using formula (45), which is an estimation function stored in the storage 41, and the estimation reference values defined in the associated estimation reference value table stored in the storage 41.

$$\text{Hot Runner Material Management Cost} = [(\text{Hot Runner System Cost}) + (GF \text{ Material Chip Cost}) + (\text{Spacer Block Cost}) * (\text{Near-Gate Hardening Cost})] * (\text{Material Management Rate}) \quad (45)$$

In this example, the material management rate is set to 6.3%.

Concerning the hot runner general management and sales cost, the data processing unit 44 makes estimation using formula (46), which is an estimation function stored in the storage 41, and the estimation reference values defined in the associated estimation reference value table stored in the storage 41.

$$\text{Hot Runner General Management \& Sales Cost} = [(\text{Hot Runner Processing Cost}) + (\text{Integration and Wiring Cost})] * (\text{General Management \& Sales Rate}) \quad (46)$$

In this example, the general management and sales rate is set to 11.2%.

Concerning the hot runner profit, the data processing unit 44 makes estimation using formula (47), which is an estimation function stored in the storage 41, and the estimation reference values defined in the associated estimation reference value table stored in the storage 41.

$$\text{Hot Runner Profit} = [(\text{Hot Runner Processing Cost}) + (\text{Integration/Wiring Cost}) + (\text{General Management \& Sales Cost})] * (\text{Profit Rate}) \quad (47)$$

In this example, the profit rate is set to 5%.

[Estimation of Each Cost Item of Molded product]

Next, each of the cost items of the molded product fabrication cost will be explained below. The molded product fabrication cost breaks down into material cost, processing cost, secondary processing cost, material management cost, general management and sales cost, profit, treatment cost, and transport and material handling cost.

The material cost is estimated from formula (48).

$$\text{Material Cost} = (\text{Material Unit Price}) \times (\text{Weight of Standard Material}) \quad (48)$$

The material unit price used in formula (48) is acquired from prescribed material unit price table (not shown). The weight of standard material used to fabricate the molded product is calculated from formula (49).

$$\text{Weight of Standard Material Used} = [(\text{Weight of Changed Material}) + (\text{Weight of Trial Shot Material})]/(\text{Work Lot}) + (\text{Defect Coef}) * [(\text{Product Weight}) + (\text{Spool Runner Weight})] * (\text{Recycled Material Content Coef}) \quad (49)$$

The weight of the changed material, which is one of the parameters used in formula (49), is acquired from the changed material weight table shown in FIG. 36. This table records the weight (grams) of changed material in association with the capacity (tons) of the molding machine. The defect coefficient and the recycled material content coefficient are acquired from the coefficient table shown in FIG. 37. The coefficient table of FIG. 37 records the defect coefficients and the recycled material content coefficients, in association with the conditions designated through the special material input box c5, external appearance grade input box c6, and runner type input box c11 of the main screen. The weight of the trial shot material is calculated from formula (50).

$$\text{Weight of Trial Shot Material} = [(\text{Product Weight}) + (\text{Spool Runner Weight})] * (\text{\# of Molded product Per Shot}) * 10 \quad (50)$$

The value "10" in formula (50) is introduced because ten shots are taken as the trial shot.

Figure 38:
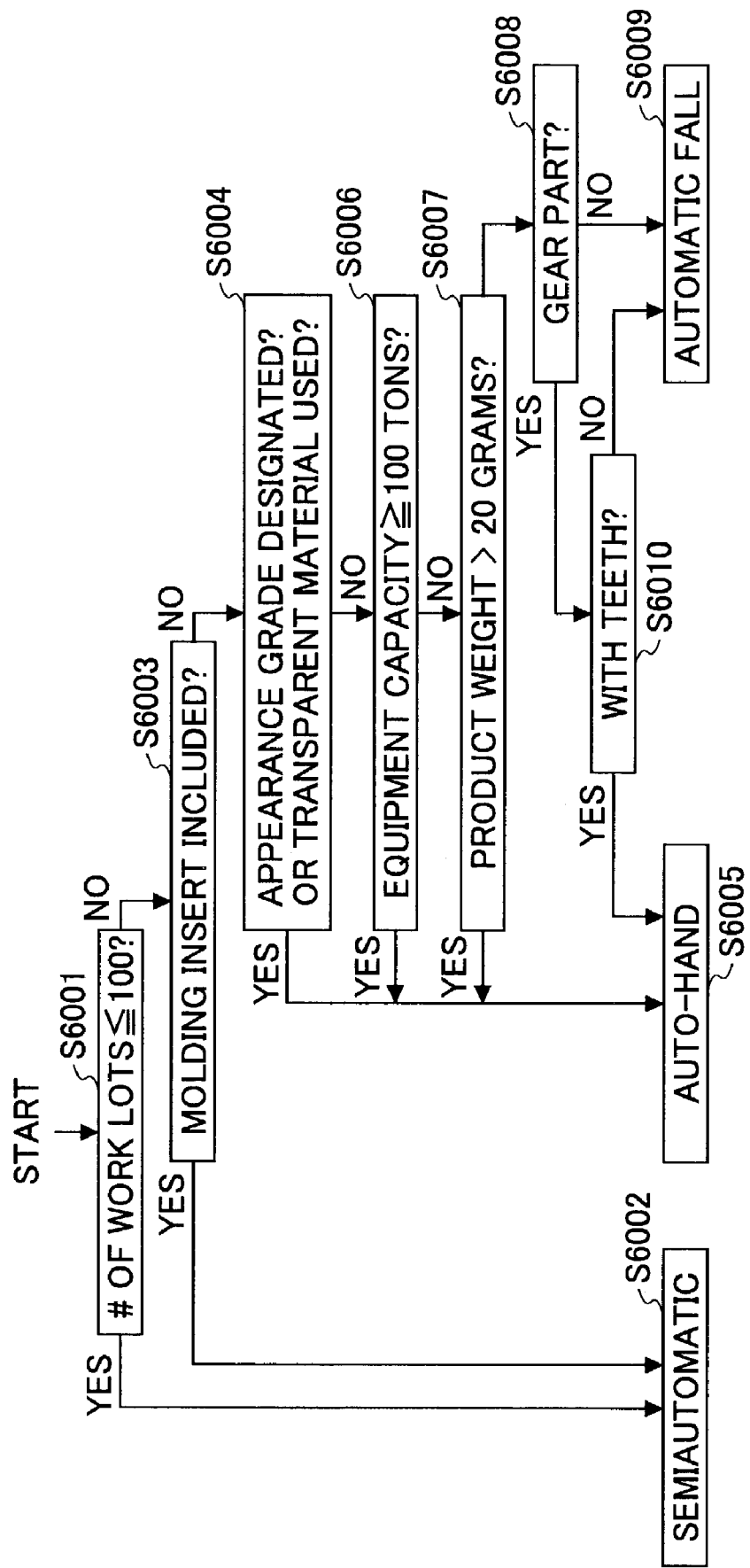
FIG. 38 is a flowchart for determining a product extraction method.

In estimating the molded product processing cost, formula (or the estimation function) differs depending on the extraction method of the molded product under estimation. Accordingly, the data processing unit 44 has to determine the extraction method of the molded product, prior to the estimation of the molded product processing cost. The extraction method is determined following the operation flow shown in FIG. 38.

First, the data processing unit 44 determines whether the value of the monthly lot designated in the monthly lot input box b1 is at or below 100 (S6001).

If the value of the monthly lot is at or below 100 (YES in S6001), the data processing unit 44 selects "Semi-automatic" extraction method (S6002). If the monthly lot is above 100 (NO in S6001), the data processing unit 44 determines whether one or more molding inserts are used (S6003). The determination of step S6003 is carried out by determining whether the value of the molding insert number input box c7 is other than zero.

If a molding insert is used (YES in S6003), the data processing unit 44 selects "semi-automatic" extraction method (S6002). If no molding insert is used (NO in S6003), then the data processing unit 44 determines whether any external appearance grade or use of transparent material is designated in the appearance grade input box c6 or the special material input box c5 (S6004).

If external appearance grade or a transparent material is designated (YES in S6004), the data processing unit 44 selects "auto-hand" extraction method (S6005). If neither appearance grade or transparent material is designated (NO in S6004), then the data processing unit 44 determines whether the capacity of the molding machine used to produce the molded product is at or above 100 tons (S6006). As is explained above, the capacity of the molding machine can be determined from the molding capacity selection table shown in FIG. 26, based on the length, the width, and the depth of the molded product input through the molding size input box d1, the projected area of the molded product input through the projected area input box d7, and the number of plate of the mold input through the mold plate type input box c2.

If the capacity of the molding machine is at or above 100 tons (YES in S6006), the data processing unit 44 selects "auto-hand" extraction method (S6005). If the capacity of the molding machine is below 100 tons (NO in S6006), then the data processing unit 44 determines whether the weight of the molded product input through the product weight input box d3 is over 20 grams (S6007).

If the product weight is over 20 grams (YES in S6007), the data processing unit 44 selects "auto-hand" extraction method (S6005). If the product weight is at or below 20 grams (NO in S6007), the data processing unit 44 determines whether a gear part is designated in gear information input box d10 (S6008). If the number of gear steps of the spur gear or the helical gear is other than zero, the gear is designated.

If there is no designation of gear part (NO in S6008), the data processing unit 44 selects "automatic fall" method as the extraction method (S6009). If the gear part is designated (YES in S6008), the data processing unit 44 determines whether a gear tooth is present, that is, whether "YES" is selected in the gear tooth input box d9 (S6010).

If a gear tooth is present (YES in S6010), the data processing unit 44 selects "auto-hand" extraction method (S6005). If there are no gear teeth (NO in S6010), the data processing unit 44 selects "automatic fall" method as the extraction method (S6009).

When the "semi-automatic" extraction method is selected, the data processing unit 44 estimates change-over cost as a part of the molded product processing cost, using formula (51) stored as an estimation function in the storage 41 and estimation reference values defined in the associated reference value tables stored in the storage 41. The data processing unit 44 also estimates equipment and work place common ($WPC_E$) cost as a part of the molded product processing cost using formula (52) and the estimation reference values recorded in the associated reference value tables stored in the storage 41. In addition, labor and work place common ($WPC_L$) cost of the molded product processing is estimated using formula (53) and estimation reference values of the associated reference value tables stored in the storage 41. The data processing unit 44 sums up the change-over cost, the equipment and $WPC_E$ cost, and the labor and $WPC_L$ cost to determine the processing cost corresponding to the "semi-automatic extraction method".

$$\text{Change-over Cost} = [(\text{Molding Change-over Net Time})/(\text{Work Lot})] * (\text{Time Coef}) * [(Eq \ \& \ WPC_E \ \text{Cost Rate} + \text{Labor} \ \& \ WPC_L \ \text{Cost Rate})] \quad (51)$$

-continued $$\begin{aligned}\text{Equipment and } WPC_E \text{ Cost} = &[A + (\text{Molding Insert Net Time}) + \\ &((\text{Molding Insert Net Time}) - 1) * \\ &((\# \text{ of Inserts}) - 1) * (\text{Time Coef})] * \\ &(Eq \ \& \ WPC_E \text{ Cost Rate}) \\ A = &[(\text{Molding Basic Net Time}) * \\ &(1 + (\text{Size Grade Coef}) + \\ &(\text{Geometric Tolerance Coef}) + \\ &(\text{Plate Thickness Coef}) + \\ &(\text{Material Quality Coef})) * \\ &(\text{Hot Runner Coef}) + \\ &(\text{Extraction Time}) + (\text{Slide Time})] / \\ &(\# \text{ of Molded Product Per Shot})\end{aligned}$$ (52)

$$\begin{aligned}\text{Labor and } WPC_L \text{ Cost} = &[A + (\text{Molding Insert Net Time}) + \\ &((\text{Molding Insert Net Time}) - 1) * \\ &((\# \text{ of Inserts}) - 1) * (\text{Time Coef})] * \\ &(\text{Labor} \ \& \ WPC_L \text{ Cost Rate})\end{aligned}$$ (53)

The equipment and WPC$_E$ cost rate and the labor and WPC$_L$ cost rate, which are estimation reference values used formulas (51), are acquired from the molding primary processing C/C cost rate sum-up table shown in FIG. 28. The molding net time (sec) and the time coefficient are acquired from the molding machine process time determination table shown in FIG. 39.

Among the molding insert net time, the time coefficient, size grade coefficient, geometric tolerance coefficient, plate thickness coefficient, and material quality coefficient used as estimation reference values in formula (52), the molding insert net time (sec) and the time coefficient are acquired from the molding machine process time determination table shown in FIG. 39. The size grade coefficient, the geometric tolerance coefficient, the plate thickness coefficient, and the material quality coefficient are acquired from the tables shown in FIG. 40A, FIG. 40B, FIG. 40C, and FIG. 40D, respectively.

The molding insert net time and the equipment and WPC$_E$ cost rate used as parameters (estimation reference values) in formula (53) are acquired from tables shown in FIG. 39 and FIG. 28, respectively.

If "auto-hand" extraction method is selected in the extraction method determination step, the data processing unit 44 estimates change-over cost using formula (54) and estimation reference values defined in the associated reference value tables stored in the storage 41. The data processing unit 44 also estimates equipment and work place common (WPC$_E$) cost and the labor and work place common (WPC$_L$) cost using formulas (55) and (56), respectively, together with estimation reference values of the associated reference value tables stored in the storage 41. Then the data processing unit 44 adds the change-over cost, the equipment and work place common (WPC$_E$) cost, and the labor and work place common (WPC$_L$) cost to determine the molded product processing cost corresponding to the "auto-hand" extraction method.

$$\begin{aligned}\text{Change-over Cost} = &[((\text{Molding Change-over Net Time}) + \\ &(\text{Auto-hand Change-Over Net Time})/\end{aligned}$$ (54)

-continued
$$\begin{aligned}&(\text{Work Lot})] * (\text{Time Coef}) * \\ &[(Eq \ \& \ WPC_E \text{ Cost Rate} + \\ &(\text{Labor} \ \& \ WPC_L \text{ Cost Rate})]\end{aligned}$$

The molding change-over net time (sec), the auto-hand change-over net time (sec), and the time coefficient are acquired from the table shown in FIG. 39. The equipment and WPC$_E$ cost rate and the labor and WPC$_L$ cost rate are obtained from the molding primary processing C/C cost rate sum-up table shown in FIG. 28.

$$\begin{aligned}\text{Equipment and } WPC_E \text{ Cost} = &B * (\text{Time Coef}) * \\ &(Eq \ \& \ WPC_E \text{ Cost Rate}) \\ B = &[(\text{Molding Basic Net Time}) * \\ &(1 + (\text{Size Grade Coef}) + \\ &(\text{Geometric Tolerance Coef}) + \\ &(\text{Plate Thickness Coef}) + \\ &(\text{Material Quality Coef})) * \\ &(\text{Hot Runner Coef}) + \\ &(\text{Auto-Hand Adding Net Time}) + \\ &(\text{Slide Time})] / \\ &(\# \text{ of Molded product Per Shot})\end{aligned}$$ (55)

$$\text{Labor and } WPC_L \text{ Cost} = B*(\text{Time Coef})*(\text{Labor} \ \& \ WPC_L \text{ Cost Rate})$$ (56)

The molding basic net time (sec) and the auto-hand basic net time (sec) are acquired from the molding machine process time determination table shown in FIG. 39. The equipment and WPC$_E$ cost rate and the labor and WPC$_L$ cost rate are acquired from the molding primary processing C/C cost rate sum-up table shown in FIG. 28. The hot runner coefficient is acquired from the hot runner coefficient table shown in FIG. 40F. The size grade coefficient, the geometric tolerance coefficient, and the material quality coefficient are acquired from the tables shown in FIG. 40A, FIG. 40B, and FIG. 40D, respectively.

If "automatic fall" method is selected in the extraction method determination step, the data processing unit 44 estimates change-over cost using formula (51) and estimation reference values defined in the associated reference value tables stored in the storage 41. The data processing unit 44 also estimates equipment and work place common (WPC$_E$) cost and the labor and work place common (WPC$_L$) cost using formula (57) and (58), respectively, together with estimation reference values of the associated reference value tables stored in the storage 41. Then the data processing unit 44 adds the change-over cost, the equipment and work place common (WPC$_E$) cost, and the labor and work place common (WPC$_L$) cost to determine the molded product processing cost corresponding to the "automatic fall" method.

$$\begin{aligned}
\text{Equipment and } WPC_E \text{ Cost} = &(C + (\text{Gear Adding Time})) * \\
&(\text{Time Coef}) * (Eq \ \& \ WPC_E \text{ Cost Rate}) \\
C = &[(\text{Molding Basic Net Time}) * \\
&(1 + (\text{Size Grade Coef}) + \\
&(\text{Geometric Tolerance Coef}) + \\
&(\text{Plate Thickness Coef}) + \\
&(\text{Material Quality Coef})) * \\
&(\text{Hot Runner Coef}) + \\
&(\text{Slide Time})] / \\
&(\text{\# of Molded product Per Shot})
\end{aligned} \quad (57)$$

$$\begin{aligned}
\text{Labor \& } WPC_L \text{ Cost} = &(C + (\text{Gear Adding Time})) * \\
&(\text{Time Coef}) * \\
&(\text{Labor \& } WPC_L \text{ Cost Rate})
\end{aligned} \quad (58)$$

The gear adding time is acquired from gear adding time determination table shown in FIG. 40E. The material quality coefficient and the hot runner coefficient are obtained from tables shown in FIG. 40D and FIG. 40F, respectively. Other parameters, such as time coefficient, the molding basic net time, the size grade coefficient, the plate thickness coefficient, the slide time, the equipment and WPC$_E$ cost rate and the labor and WPC$_L$ cost rate are acquired from the corresponding tables, which have already been described above.

Next, explanation will be made to estimation of the secondary processing cost. The secondary processing includes thirteen processes, namely, gate cutting (for side gate), gate cutting (for jump gate) press injection, bearing injection, hot insert, ultrasonic insert, heat caulking, ultrasonic welding, hot stamp, silk printing, plastic packaging, exterior cleaning, and special process. Depending on the type of the molded product, a part or all of these processes are used during the secondary processing. The required processes and the number of reparation of each process are designated in the comprehensive process setting screen shown in FIG. 5. The equipment and work place common (WPC$_E$) cost rate and the labor and work place common (WPC$_L$) cost rate are basic parameters for estimating the secondary processing cost, and they are set differently for each process, as defined in the molding secondary processing C/C cost rate sum-up table shown in FIG. 41.

When estimating the secondary processing cost, the data processing unit 44 first referred to the comprehensive process setting screen illustrated in FIG. 5 to identify the required processes and the number of repetition of each process. Then, the data processing unit 44 estimates change-over cost as a part of the secondary processing cost, using formula (59) stored as an estimation function in the storage 41 and estimation reference values defined in the associated reference value tables stored in the storage 41. The data processing unit 44 also estimates equipment and work place common (WPC$_E$) cost and the labor and work place common (WPC$_L$) cost using formulas (60) and (61), respectively, together with estimation reference values of the associated reference value tables stored in the storage 41. Then the data processing unit 44 adds the change-over cost, the equipment and work place common (WPC$_E$) cost, and the labor and work place common (WPC$_L$) cost to determine the secondary processing cost.

$$\text{Change-Over Cost} = [(\text{Required Change-over Time})/ \quad (59)$$
$$(\text{Work Lot})] *$$
$$(\text{Processing Cost Rate})$$

The processing cost rate is the sum of the equipment and WPC$_E$ cost rate and the labor and WPC$_L$ cost rate, which are obtained from the table of FIG. 41. The data processing unit 44 acquires the required change-over time, which is the estimation reference value used in formula (59), for each of the necessary processes from the secondary processing time determination table shown in FIG. 42 or FIG. 43. The processes required to product the molded product from among the above-mentioned thirteen processes are designated through the comprehensive process setting screen. The change-over time of press injection insert, bearing injection insert, hot insert, ultrasonic insert, heat caulking, gate cutting (for side gate), and gate cutting (for jump gate) are defined in the table shown in FIG. 42. The change-over time of hot stamping, silk printing, plastic packaging, ultrasonic welding, and exterior cleaning are defined in the table shown in FIG. 43.

$$\begin{aligned}\text{Equipment and } WPC_E \text{ Cost} = &\,[(\text{First Spot Processing Net Time}) + \\ &(N-1)*(2^{\text{nd}} \text{ and Subsequent Spots} \\ &\text{Processing Net Time})] * \\ &(\text{Time Coef}) * (Eq \,\&\, WPC_E \text{ Cost Rate})\end{aligned} \qquad (60)$$

$$\begin{aligned}\text{Labor } \&\, WPC_L \text{ Cost} = &\,[(\text{First Spot Processing Net Time}) + \\ &(N-1)*(2^{\text{nd}} \text{ and Subsequent Spots} \\ &\text{Processing Net Time})] * \\ &(\text{Time Coef}) * (\text{Lab} \,\&\, WPC_L \text{ Cost Rate})\end{aligned} \qquad (61)$$

where N denotes the number of spots to be processed.

The equipment and $WPC_E$ cost rate and the labor and $WPC_L$ cost rate are acquired form the molding secondary processing C/C cost rate sum-up table shown in FIG. 41. The processing net time (sec) and the time coefficient used in formulas (60) and (61) are obtained from the secondary processing time determination table shown in FIG. 42 or FIG. 43, depending on the process.

To estimate the total amount of the molded product, material management cost, general management and sales cost, profit, transport and material handling cost are also separately estimated, in addition to the primary processing cost and the secondary processing cost. These costs are also calculated based on the estimation functions and the estimation reference values tables stored in the storage 41, and detailed explanation for them are omitted.

The cost estimation results of the mold and the molded product are output by the output unit 43 when the mold cost estimation list button i and the molded product estimation button h are selected. The cost estimation result of the mold is output in the mold cost output screen, and the cost estimation result of the molded product is output in the molded product estimation output screen.

FIG. 44 illustrates an example of the mold cost output screen, in which the part number specifying a part (i.e., a molded product) to be fabricated using this mold is indicated at the top of this screen. Production base, the total number of lots, the number of plates of the mold, the number of molded products per shot, and the capacity (tons) of the molding machine are also indicated at the top. In the middle of the screen, the total cost of the mold is indicated together with the cost items.

Figure 45B:
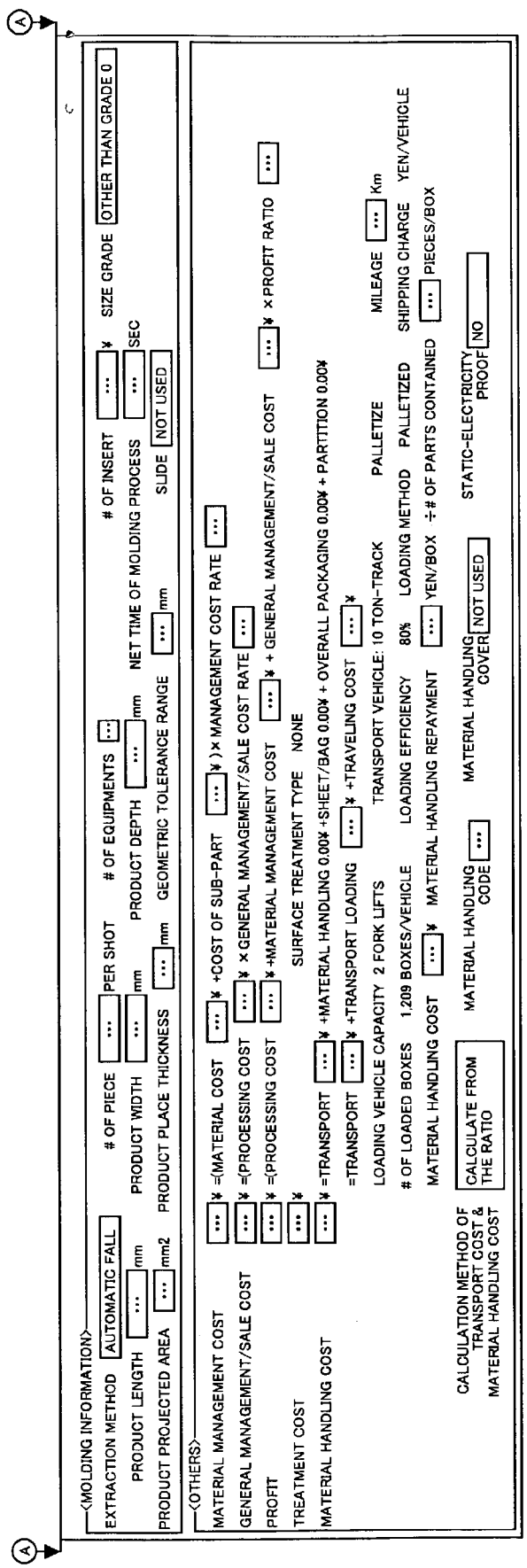
FIG. 45 illustrates an example of the molded product manufacturing cost output screen.

FIG. 45A and FIG. 45B illustrate an example of the molded product estimation output screen. FIG. 45A shows the top half of the screen, and FIG. 45B shows the bottom half of the screen. In FIG. 45A, the estimated fabrication cost of the molded product (which is a component or a part of certain product) and the work lot are indicated in the second top section. The screen also has the section of the processing information, in which processing cost, capacity (tons) of the molding machine, change-over time, processing time, equipment and $WPC_E$ cost rate, and other information are indicated. In FIG. 45B, molding information and estimation formulas of material management cost, general management and sales cost, profit, treatment cost, and material handling cost are indicated.

In this manner, upon designation of fabrication conditions of a molded product, estimation is promptly made for the mold itself used to produce the molded product at high reliability. Especially, the variable part of the mold, which defines the shape of each product, can be efficiently estimated, while maintaining the estimation error within a certain acceptable range. In general, various factors are included in estimation of the variable part of the mold, and therefore, it is inefficient for the conventional technique to estimate the mold itself taking all the factors into account. The present invention overcomes this problem, and achieves the quick and reliable estimation of the molded product, while keeping the estimation error within a specific range.

In addition, based on the fabrication conditions input through the fabrication condition input screen, fabrication costs of a molded product and a mold used to produce the molded product are estimated simultaneously. The cost estimation results of the mold and the molded product can be output separately.

The advantage of this estimation method is to allow an operator or an engineer to calculate the cost, while working on a CAD (computer aided design) system to design a product, and to simulate cost reduction based on numerical values at planning and development stages. Consequently, a severe cost target can be achieved in a shorter period of design and development.

In the above-described embodiment, fabrication conditions are input through prescribed input boxes in the main screen, material information input screen, comprehensive process setting screen, selected process information input screen, and mold information input screen. The cost is estimated based on the input conditions. However, since there are wide variety of input boxes, work load on the operator may increases.

Figure 47:
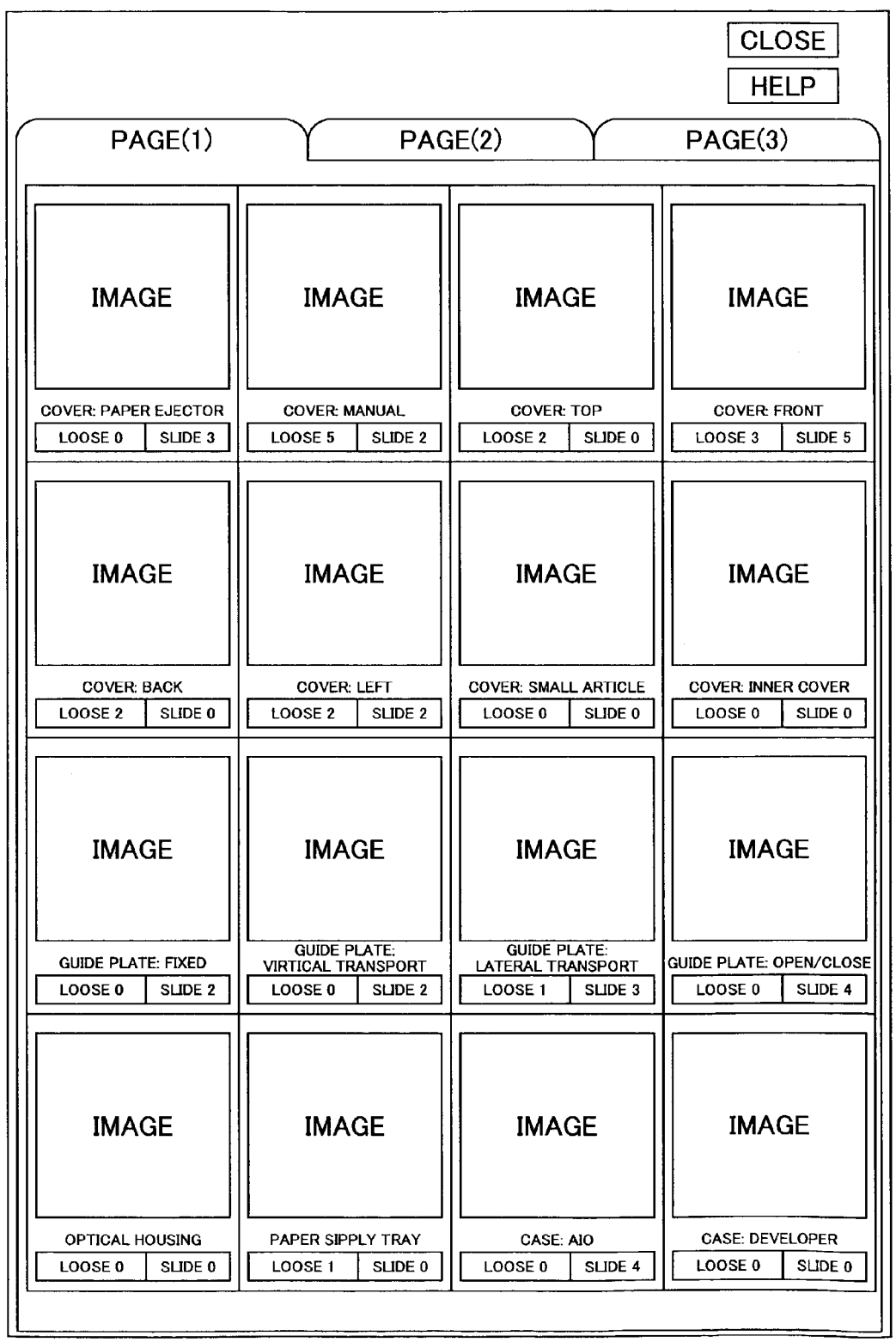
FIG. 47 illustrates an example of the molded product image selection screen.

To avoid the troublesome input work, CAD information input screen shown in FIG. 46 is provided in the embodiment. When the CAD information confirmation button j is selected in the main screen shown in FIG. 3, the data processing unit 44 causes the output unit 43 to indicate the CAD information input screen. In this screen, a CAD file produced on the CAD system is analyzed to extract those parameters required to estimate the mold and the molded product. In addition, when the "product type" button is selected in the CAD information input screen of FIG. 46, the data processing unit 44 causes the output unit 43 to display the molded product image selection screen shown in FIG. 47. In this screen, thumb-nail images of various types of molded products (parts) are arranged. In this embodiment, these molded products are stored in a prescribed field of the storage, in association with the default values of the estimation reference values used to estimate the fabrication cost of the products. When a thumb-nail image is selected through the input unit 42, the data processing unit 44 automatically reads the default values from the storage 41 corresponding to the selected image, and makes estimation of the mold cost and the fabrication cost of the selected product using the default values and the associated estimation functions. With this arrangement, troublesome input operation of all the necessary conditions through the fabrication condition input boxes can be eliminated.

Accordingly, cost estimation result of the mold can be promptly output, with or without the cost estimation result of the molded product, at high reliability upon selection of the product type using the thumb-nail image.

Although the present invention has been described based on the specific embodiments, the invention is not limited to these examples. For example, the mold processing C/C cost rate sum-up table, the molding primary processing C/C cost rate sum-up table, and the molding secondary processing C/C cost rate sum-up table are prepared separately in the embodiment; however, these tables may be integrated into a single table.

This patent application is based on and claims the benefit of the earlier filing date of Japanese patent application No. 2002-140161 filed May 15, 2002, the entire contents of which is hereby incorporated by reference.

What is claimed is:

1. An estimation system for estimating an injection molding related cost, comprising: an input unit;
a storage configured to store a mold estimation function for each of a plurality of cost items of a mold used to produce a molded product, and a mold estimation reference value table for recording mold estimation reference values in association with prescribed conditions;
a data processing unit configured to acquire that acquires a fabrication condition of the molded product through the input unit, reads the mold estimation function and one of the mold estimation reference values from the storage corresponding to the fabrication condition, and estimates a cost of the mold based on the mold estimation function and the selected mold estimation reference value,
wherein, the data processing unit is configured to retrieve the mold cost estimation function stored in the storage device to estimate processing cost of a variable part of the mold corresponding to the shape of the molded product, and the mold estimation function is a formula expressing a variable part processing time required to process the variable part of the mold, and the data processing unit is further configured to calculate the processing cost of the variable part of the mold by multiplying a fixed part average cost rate by the variable part processing time; and
an output unit configured to output a mold cost estimation result made by the data processing unit.

2. The injection molding estimation system according to claim 1, wherein the data processing unit estimates each of said cost items separately using the corresponding mold estimation function and the mold estimation reference value, and then sums up estimated amounts of the cost items of the mold to determine a total amount of cost estimation of the mold.

3. The injection molding estimation system according to claim 2, wherein the output unit outputs the estimated amounts of the individual cost items of the mold.

4. The injection molding estimation system according to claim 1, wherein the storage stores images of multiple types of molded products and default values of the mold estimation reference values for each type of molded product; and the output unit displays the images of the molded products and one of the images is selected through the input unit.

5. The injection molding estimation system according to claim 4, wherein one of said images is selected and the data processing unit reads the default values corresponding to the selected image together with the associated mold estimation function from the storage to estimate the cost of the mold used to produce the molded product of the selected image.

6. The injection molding estimation system according to claim 1, wherein the storage further stores a molded product estimation function for each of a plurality of cost items of the molded product and a molded product estimation reference value table for recording molded product estimation reference values in association with molded product fabrication conditions;
the data processing unit reads out of the storage the molded product estimation function and one of the molded product estimation reference values corresponding to one of the molded product fabrication conditions designated through the input unit, and estimates cost of the molded product based on the molded product estimation function and the molded product estimation reference value; and
the output unit outputs a cost estimation result of the molded product made by the data processing unit.

7. The injection molding estimation system according to claim 6, wherein the data processing unit estimates each of said cost items of the molded product separately using the corresponding molded product estimation function and the molded product estimation reference value, and then sums up estimated amounts of the cost items of the molded product to determine a total amount of cost estimation of the molded product.

8. The injection molding estimation system according to claim 7, wherein the output unit outputs the estimated amounts of the individual cost items of the molded product.

9. The injection molding estimation system according to claim 6, wherein the storage stores images of multiple types of molded products and default values of the molded product estimation reference values for each type of molded product; and
the output unit displays the images of the molded products and one of the images is selected through the input unit.

10. The injection molding estimation system according to claim 9, wherein one of the images is selected using the input unit and the data processing unit reads the default values of the molded product reference values corresponding to the selected image, together with the associated mold estimation function, from the storage to estimate the cost of the molded product.

11. The injection molding estimation system according to claim 1, wherein the mold estimation reference value includes a molded product coefficient defining a type of the molded product to be produced, a geometric tolerance coefficient defining a range of a geometric tolerance, a size grade coefficient defining classification of the size of the molded product, and a hardening coefficient defining whether a hardening process is required; and the formula is expressed as $$\text{Variable Part Processing Time} = C*(V*N)^{1/2}Cp*(1+Cg+Cs)*(1+Ch)$$

where C denotes an estimation coefficient, V denotes a volume of the molded product, N denotes a number of molded products taken per shot, Cp denotes the molded product coefficient, Cg denotes the geometric tolerance coefficient, Gs denotes the size grade coefficient, and Ch denotes the hardening coefficient.

12. An injection molding estimation method comprising the steps of:
storing a mold estimation function for each of a plurality of cost items of a mold used to produce a molded product by injection molding, and a mold estimation reference value table for recording mold estimation reference values in association with prescribed conditions;

acquiring a fabrication condition of the molded product;

reading the mold estimation function and one of the mold estimation reference values corresponding to the acquired fabrication condition;

estimating cost of the mold based on the mold estimation function and one of said mold estimation reference values, wherein, the mold estimation function is used to estimate processing cost of a variable part of the mold corresponding to the shape of the molded product, and the mold estimation function is a formula expressing a variable part processing time required to process the variable part of the mold;

estimating a processing cost of a variable part of the mold that characterizes the shape of the molded product;

storing the mold estimation function expressing a variable part processing time required to process the variable part of the mold;

calculating the processing cost of the variable part of the mold by multiplying a fixed part average cost rate by the variable part processing time; and outputting a cost estimation result of the mold.

13. The injection molding estimation method according to claim 12, wherein the estimating step includes:

estimating each of said cost items separately using the corresponding mold estimation function and the mold estimation reference value; and summing up estimated amounts of the cost items of the mold to determine a total amount of cost estimation of the mold.

14. The injection molding estimation method according to claim 13, wherein the outputting step includes:

outputting the estimated amounts of the individual cost items of the mold.

15. The injection molding estimation method according to claim 12, wherein the storing step includes:

storing images of multiple types of molded products and default values of the mold estimation reference values for each type of molded product; and the outputting step includes:

displaying the images of the molded products.

16. The injection molding estimation method according to claim 15, further comprising the step of:

selecting one of the images;

reading the default values corresponding to the selected image together with the associated mold estimation function; and estimating the cost of the mold used to produce the molded product of the selected image.

17. The injection molding estimation method according to claim 12, wherein the storing step includes the steps of:

storing, as the mold estimation reference value, a molded product coefficient defining a type of the molded product to be produced, a geometric tolerance coefficient defining a range of a geometric tolerance, a size grade coefficient defining classification of the size of the molded product, and a hardening coefficient defining whether a hardening process is required; and storing the mold estimation function expressed as $$\text{Variable Part Processing Time} = C * (V*N)^{1/2} * Cp * (1+Cg+Cs) * (1+Ch)$$

where C denotes an estimation coefficient, V denotes a volume of the molded product, N denotes a number of molded products taken per shot, Cp denotes the molded product coefficient, Cg denotes the geometric tolerance coefficient, Gs denotes the size grade coefficient, and Ch denotes the hardening coefficient.

18. A computer readable medium having computer readable instructions embodied therein which when executed by the computer implement an injection molding estimation method comprising the steps of:

storing a mold estimation function for each of cost items of a mold used to produce a molded product by injection molding, and to store mold estimation reference values in association with prescribed conditions;

acquiring by the data processing unit a fabrication condition of the molded product;

reading by the data processing unit the mold estimation function and one of the mold estimation reference values from the storage corresponding to the acquired fabrication condition;

estimating by the data processing unit cost of the mold based on the mold estimation function and said one of the mold estimation reference values, wherein, the mold estimation function is used to estimate processing cost of a variable part of the mold corresponding to the shape of the molded product, and the mold estimation function is a formula expressing a variable part processing time required to process the variable part of the mold; and calculating by the data processing unit a processing cost of a variable part of the mold by multiplying a fixed part average cost rate by a variable part processing time; and outputting by the output unit a cost estimation result of the mold.

* * * * *